United States Patent
Lee

(10) Patent No.: US 8,678,724 B2
(45) Date of Patent: Mar. 25, 2014

(54) TOOL HOLDER AND MACHINE TOOL

(71) Applicant: Sung Geun Lee, Kanagawa (JP)

(72) Inventor: Sung Geun Lee, Kanagawa (JP)

(*) Notice: Subject to any disclaimer, the term of this patent is extended or adjusted under 35 U.S.C. 154(b) by 0 days.

(21) Appl. No.: 13/719,442

(22) Filed: Dec. 19, 2012

(65) Prior Publication Data

US 2013/0108380 A1 May 2, 2013

Related U.S. Application Data

(63) Continuation of application No. PCT/JP2011/079231, filed on Dec. 16, 2011, which is a continuation of application No. PCT/JP2011/051251, filed on Jan. 24, 2011.

(51) Int. Cl.
*B23Q 11/10* (2006.01)

(52) U.S. Cl.
USPC ............... 409/136; 279/20; 408/59; 408/61

(58) Field of Classification Search
USPC ........ 279/20; 409/136; 408/56, 58, 59, 60, 61
See application file for complete search history.

(56) References Cited

U.S. PATENT DOCUMENTS 5,090,849 A * 2/1992 Arai et al. .................... 409/137
5,358,360 A 10/1994 Mai

FOREIGN PATENT DOCUMENTS

| JP | 63-035556 U | 3/1988 |
| JP | 3-123657 U | 12/1991 |
| JP | 4-176538 A | 6/1992 |
| JP | 6-027046 U | 4/1994 |
| JP | 07051982 A * | 2/1995 |
| JP | 10118812 A * | 5/1998 |
| JP | 2003-001454 A | 1/2003 |
| JP | 2009-006435 A | 1/2009 |

OTHER PUBLICATIONS

International Search Report corresponding to PCT/JP2011/079231, dated Jan. 24, 2012.

* cited by examiner

*Primary Examiner* — Daniel Howell
*Assistant Examiner* — Nicole N Ramos
(74) *Attorney, Agent, or Firm* — Lowe Hauptman & Ham, LLP

(57) ABSTRACT

A tool holder includes: a shank portion gripped by a main shaft; a tool attachment portion having an insertion port into which a tool is inserted in a tip end surface thereof; a cover having a tubular wall that covers an outer periphery of the tool attachment portion and a bottom surface that covers the tip end surface of the tool attachment portion; a bearing provided between the tubular wall of the cover and the tool attachment portion; and a stopper that prevents the cover from co-rotating with the tool attachment portion. A through hole penetrated by the tool and an ejection port disposed on a periphery of the through hole in order to eject the coolant toward the tool are provided in the bottom surface of the cover.

16 Claims, 11 Drawing Sheets

(a)

(b) (c)

(d)

(a)

(b)

(a)

(b)

INNER RACE ROTATION DIRECTION

TOOL HOLDER AND MACHINE TOOL

RELATED APPLICATIONS

The present application is a bypass continuation of International Application Number PCT/JP2011/079231, filed Dec. 16, 2011, which is a continuation of International Application Number PCT/JP2011/051251, filed Jan. 24, 2011, the disclosure of which is hereby incorporated by reference herein in its entirety.

TECHNICAL FIELD

The present invention relates to a tool holder for attaching a tool such as an end mill, a face mill, a drill, a tap, or a reamer, for example, to a main shaft of a machine tool, and a machine tool that uses the tool holder.

BACKGROUND ART

To extend the life of a tool, conventionally cutting oil (a coolant) is typically supplied to the tool during machining by a machine tool.

An external oil feeding method, in which the cutting oil is ejected toward the tool from an externally provided nozzle, is employed conventionally as a cutting oil supply method. With the external oil feeding method, however, the cutting oil ejected from the nozzle may be blocked by a work piece so as to be unable to reach a work part, and it is therefore difficult to supply the cutting oil effectively. Further, the work piece and the nozzle may interfere with each other, and therefore the nozzle must be provided in a position far removed from the work piece, making it difficult to supply the cutting oil to the work part precisely. Moreover, with the popularization of machine tools such as machining centers, in which tools are exchanged by an ATC (Automatic Tool Changer) during machining, it has become necessary to modify a cutting oil supply position for each tool, but the external oil feeding method, in which the position and orientation of the nozzle are fixed, is unable to respond to this requirement. Hence, the external oil feeding method has been replaced by a cutter through method or a gap through method, to be described below, and it is now rare to use the external oil feeding method in a machine tool.

In the cutter through method, an oil feeding hole that opens onto a tool tip end is provided in a tool interior, and the cutting oil is supplied to the work part through the oil feeding hole (see Patent Documents 1 and 2).

In the cutter through method, however, the oil feeding hole opens onto the tip end of the tool, and therefore, in a tool that cuts a work piece using a blade portion on a tool outer peripheral surface, such as a face mill or an end mill, the blade portion cannot be lubricated and cooled efficiently. Further, since the oil feeding hole must be provided in the tool interior, the tool becomes expensive. Moreover, when the tool has a small diameter, it is extremely difficult to form the oil feeding hole in the tool interior.

In the gap through method, meanwhile, a gap nut is attached to a tip end of the tool holder, and the cutting oil is ejected through a gap between the gap nut and a tool outer periphery. Therefore, the gap through method can be used with tools not having an internal oil feeding hole.

Patent Document 3, for example, describes a tool holder that is compatible with the gap through method. In this tool holder, a gap nut having a spiral groove on an inner peripheral side thereof is attached to a tip end, and cutting oil is ejected through a gap between the gap nut and the tool outer periphery. As a result, the cutting oil ejected so as to travel around the spiral groove of the gap nut is supplied to the work part efficiently along a flank of the tool.

Further, Patent Document 4, although not related to a method of feeding oil to a tool holder, describes a drive spindle employing a traction drive method in which rotation input from a transmission shaft coupled to a spindle of a machine tool is increased in speed by a traction transmission mechanism and then transmitted to a main shaft. The traction transmission mechanism is constituted by a combination of a planetary roller and a sun roller such that rotation is transmitted from the planetary roller, which revolves together with the spindle, to the sun roller, which is coupled to the main shaft. A working tool attachment portion is provided on a tip end of the main shaft into which rotation is input from the transmission shaft via the traction transmission mechanism, and a tool (a grinding wheel, for example) is attached to the working tool attachment portion.

Further, the drive spindle described in Patent Document 4 is provided with a cooling device for cooling the traction transmission mechanism and a main shaft bearing. The cooling device includes cooling jackets provided respectively on an outer periphery of the traction transmission mechanism and an outer periphery of the main shaft bearing, and a cooling medium passage extending from a location on an outer periphery of the transmission shaft to the cooling jacket provided on the main shaft bearing via the cooling jacket provided on the traction transmission mechanism. A cooling medium flowing into the cooling medium passage passes through the cooling jacket of the traction transmission mechanism and the cooling jacket of the main shaft bearing, and is then ejected through an ejection port formed in a bearing retainer plate that presses an outer race of the main shaft bearing.

Patent Document 1: Japanese Patent Application Publication No. 2009-6435
Patent Document 2: Japanese Patent Application Publication No. H4-176538
Patent Document 3: Japanese Patent Application Publication No. 2003-1545
Patent Document 4: Japanese Utility Model Application Publication No. H3-123657

In the gap through method, however, the ejected cutting oil spreads due to centrifugal force, and therefore the cutting oil cannot be supplied efficiently to the work part. Particularly when the tool is rotated at high speed, a large amount of heat is generated by the work part, and therefore a large amount of cutting oil is required to cool the tool. However, it is difficult to supply a sufficient amount of cutting oil to the work part due to the effect of the centrifugal force.

In the drive spindle employing the traction drive method, described in Patent Document 4, the cooling medium is ejected through the ejection port positioned on the outer periphery of the main shaft, but the ejection port is provided in a position removed from the tool attached to the working tool attachment portion, which is positioned on the tip end side of the main shaft. The reason for this is that in order to realize the function of the traction transmission mechanism for increasing the speed of the rotation input from the spindle side of the machine tool and then transmitting the rotation to the main shaft side, the traction transmission mechanism must be provided between the spindle of the machine tool and the main shaft having the tool attached to the tip end thereof. It is therefore difficult to supply the cooling medium to the work part precisely through the ejection port located far from the tool.

Further, in the drive spindle described in Cited Document 4, to ensure that rotation can be transmitted from the planetary roller to the sun roller in the traction transmission mechanism, a housing provided on an outer periphery of the planetary roller must be prevented from co-rotating therewith. If co-rotation of the housing is not prevented, the housing rotates as the planetary roller revolves such that torque is not transmitted to the sun roller when the planetary roller revolves around the sun roller, and as a result, the sun roller does not rotate. Hence, in the drive spindle described in Patent Document 4, a whirl-stop pin is inserted into an upper surface of the housing to prevent the housing from co-rotating. In other words, in Patent Document 4, the housing is prevented from co-rotating to ensure that rotation can be transmitted from the planetary roller to the sun roller in the traction transmission mechanism, but not to reduce the effect of the centrifugal force exerted on the cooling medium ejected through the ejection port formed in the bearing retainer plate.

Hence, Patent Document 4 teaches that co-rotation of the housing is to be prevented in order to realize the original functions of the traction transmission mechanism only when the traction transmission mechanism is provided between the spindle of the machine tool and the main shaft having the tool attached to the tip end thereof. Accordingly, Patent Document 4 provides no description of a solution with which the cutting oil can be ejected from a position close to the work part and supplied to a desired position without being affected by centrifugal force.

DISCLOSURE OF THE INVENTION

The present invention has been designed in consideration of the circumstances described above, and an object thereof is to provide a tool holder and a machine tool with which a coolant can be ejected from a position close to a work part and the coolant can be supplied to a desired position without the need to provide an oil feeding hole in a tool interior.

A tool holder according to the present invention for attaching a tool to a main shaft of a machine tool includes: a shank portion provided on one end of said tool holder and gripped by the main shaft; a tool attachment portion provided on another end of said tool holder and having an insertion port into which the tool is inserted in a tip end surface thereof; a cover having a tubular wall that covers an outer periphery of the tool attachment portion and a bottom surface that covers the tip end surface of the tool attachment portion; a bearing provided between the tubular wall of the cover and the tool attachment portion; and a stopper that prevents the cover from co-rotating with the tool attachment portion, wherein a through hole penetrated by the tool and an ejection port disposed on a periphery of the through hole in order to eject a coolant toward the tool are provided in the bottom surface of the cover.

Here, the coolant may be aqueous or non-aqueous cutting oil, mist (liquid microparticles contained in a gas), or air.

In this tool holder, the cover is attached so as to cover the outer periphery and the tip end surface of the tool attachment portion, the cover is prevented from co-rotating with rotation of the tool holder (the tool attachment portion) by the bearing and the stopper, and the coolant is ejected through the ejection port provided in the bottom surface of the cover, and therefore an effect of centrifugal force on the ejected coolant can be suppressed greatly. As a result, the coolant can be supplied to a desired position.

Further, since the coolant is ejected through the ejection port provided in the bottom surface of the cover, there is no need to provide an oil feeding hole in the interior of the tool, in contrast to a conventional cutter through method.

Moreover, the through hole penetrated by the tool is provided in the bottom surface of the cover, and the coolant is ejected through the ejection port disposed on the periphery of the through hole, and therefore the ejection port can be positioned close to a work part. As a result, the coolant can be supplied precisely to the work part.

Further, in the tool holder described above, the bearing is preferably lubricated and cooled by a part of the coolant.

By lubricating and cooling the bearing using a part of the coolant in this manner, the tool can be rotated at high speed without causing seizure of the bearing.

In the tool holder described above, a first flow passage through which the coolant supplied from the main shaft side flows is preferably provided in an interior of the shank portion and the tool attachment portion such that the coolant is led between the tip end surface of the tool attachment portion and the bottom surface of the cover through the first flow passage, a second flow passage through which the coolant led between the tip end surface of the tool attachment portion and the bottom surface of the cover via the first flow passage flows toward the bearing is preferably provided between the tubular wall of the cover and the tool attachment portion, and the bearing is preferably lubricated and cooled by the coolant supplied via the second flow passage.

By providing the first flow passage through which the coolant supplied from the main shaft side flows in the interior of the shank portion and the tool attachment portion in this manner, a coolant flow passage is connected from the main shaft to the ejection port in the bottom surface of the cover simply by attaching the tool holder to the main shaft. As a result, the tool holder can be applied to automatic exchange by an ATC (Automatic Tool Changer) easily.

Further, by supplying the coolant to the bearing through the second flow passage, the bearing can be lubricated and cooled, whereby seizure of the bearing can be prevented. Therefore, even when the tool is rotated at high speed, machining can be performed with stability and without causing seizure of the bearing. The inventor has confirmed in actuality that seizure does not occur in the bearing under a tool rotation speed condition of approximately 20,000 rpm when aqueous cutting oil is supplied to the bearing through the second flow passage.

In this case, a third flow passage including a communicating hole that extends outward in a radial direction of the cover and a discharge hole that leads to the outside from the communicating hole, through which the coolant is discharged after lubricating and cooling the bearing, may be formed in an interior of the cover.

By providing the third flow passage to promote discharge of the coolant following cooling and lubrication of the bearing, stagnation of the coolant around the bearing can be prevented such that fresh coolant is supplied to the bearing at all times, with the result that cooling and lubrication can be performed efficiently. Further, the coolant flows gently from the bearing toward the outside through the third flow passage, and therefore intermixing of air bubbles from the outside as the bearing rotates can be prevented. Moreover, even when foreign matter becomes intermixed in the coolant for some reason, the foreign matter can be discharged to the outside reliably so as not to impair the functions of the bearing.

In the tool holder described above, a recessed portion may be provided in an outer periphery of the cover, and the stopper may include a whirl-stop pin that engages with the recessed portion in order to prevent the cover from co-rotating.

By using the stopper including the whirl-stop pin that engages with the recessed portion in the outer periphery of the cover in this manner, the cover can be prevented from co-rotating by means of a simple configuration.

In this case, a gap (play) between the recessed portion and the whirl-stop pin in a circumferential direction of the cover when the whirl-stop pin is engaged with the recessed portion is preferably no less than 0.1 mm and no more than 0.5 mm.

By setting the cover circumferential direction gap (play) between the recessed portion in the outer periphery of the cover and the whirl-stop pin in the engaged condition at no less than 0.1 mm in this manner, the whirl-stop pin can be inserted into the recessed portion easily. By setting the gap (play) at no less than 0.5 mm, meanwhile, it is possible to avoid situations in which the cover rotates when a tool such as a tap is rotated in reverse such that the coolant is affected by centrifugal force, or the whirl-stop pin collides with a wall surface of the recessed portion such that an impact is generated.

Further, an outer diameter of the cover in a location where the recessed portion is provided may be substantially constant regardless of a diameter of the tool attachment portion.

In so doing, the whirl-stop pin can be engaged with the recessed portion in the outer periphery of the cover when moved by an identical stroke regardless of the diameter of the tool attachment portion. As a result, the tool holder can be applied to automatic exchange by an ATC (Automatic Tool Changer) easily.

Further, a plurality of the recessed portions are preferably provided around an entire circumference of the cover, and the stopper preferably further includes an actuator that moves the whirl-stop pin, and a spring provided between the actuator and the whirl-stop pin.

By providing the spring between the actuator that moves the whirl-stop pin and the whirl-stop pin, the spring bends when the whirl-stop pin deviates slightly from a position of the recessed portion after being pressed against the outer periphery of the cover by the actuator, and as a result, the whirl-stop pin enters the recessed portion. Hence, the tool holder can be applied to automatic exchange by an ATC (Automatic Tool Changer) easily.

Further, the spring contracts so as to absorb an excessive stroke by the whirl-stop pin, and therefore an amount by which the actuator moves the whirl-stop pin can be set in common for covers of all sizes.

In this case, the stopper preferably further includes a rod that is caused to advance and retreat in a diagonal direction relative to a tool axial center direction by a driving force of the actuator, and the whirl-stop pin is preferably supported on the rod via the spring.

By disposing the rod that is caused to advance and retreat by the driving force of the actuator diagonally relative to the tool axial center direction, the stopper (the actuator and the rod) can be prevented from interfering with a work piece.

In the tool holder described above, the first flow passage through which the coolant supplied from the main shaft side flows may be provided in the interior of the shank portion and the tool attachment portion such that the coolant is led between the tip end surface of the tool attachment portion and the bottom surface of the cover through the first flow passage, and a rectifying member may be provided in the first flow passage on an upstream side of a rear end surface of the tool to rectify the coolant so that the coolant flows toward a gap between a peripheral edge of the rear end surface of the tool and an inner wall surface of the tool attachment portion forming the first flow passage.

By providing the rectifying member on the upstream side of the rear end surface of the tool in the first flow passage provided in the interior of the tool attachment portion in this manner, the coolant can be rectified by the rectifying member so as to pass through the gap between the peripheral edge of the rear end surface of the tool and the inner wall surface of the tool attachment portion smoothly, without impinging on the rear end surface of the tool. As a result, a loss of momentum in the flow of the coolant caused by impingement of the coolant on the rear end surface of the tool can be prevented.

Particularly in a case where air is used as the coolant, the flow of the coolant (air) decreases dramatically in momentum when the coolant impinges on the rear end surface of the tool. Therefore, providing the rectifying member described above is extremely advantageous in terms of maintaining momentum in the flow of the coolant (air).

In this case, the rectifying member may increase a pressure of the coolant by reducing a sectional area of the first flow passage.

Centrifugal force varies in accordance with the rotation speed of the tool. It may therefore be difficult to supply the coolant flowing through the first flow passage to the gap between the peripheral edge of the rear end surface of the tool and the inner wall surface of the tool attachment portion, and as a result, a part of the coolant may impinge on the rear end surface of the tool or the inner wall surface of the first flow passage. By reducing the sectional area of the first flow passage using the rectifying member as described above, such that the pressure of the coolant increases, a directivity of the coolant passing through the rectifying member toward a desired position (the gap between the peripheral edge of the rear end surface of the tool and the inner wall surface of the tool attachment portion) is enhanced. Therefore, the coolant flowing through the first flow passage can be led more effectively to the gap between the peripheral edge of the rear end surface of the tool and the inner wall surface of the tool attachment portion.

Further, by increasing the pressure of the coolant flowing through the first flow passage using the rectifying member, the high-pressure coolant can be ejected forcefully through the ejection port. Particularly when air is used as the coolant, it is more difficult to supply an amount of coolant (air) required to cool the tool than with other types of coolant, and therefore increasing the pressure of the coolant using the rectifying member is extremely advantageous in terms of enabling forceful ejection of the high-pressure coolant through the ejection port.

The tool holder described above may further include a vane portion that is provided between the tubular wall of the cover and the tool attachment portion to push the coolant out toward the tip end surface of the tool attachment portion.

By providing the vane portion between the tubular wall of the cover and the tool attachment portion, the coolant can be pushed out toward the tip end surface of the tool attachment portion, and therefore the high-pressure coolant can be ejected forcefully through the ejection port in the bottom surface of the cover. Particularly when air is used as the coolant, it is more difficult to supply the amount of coolant (air) required to cool the tool than with other types of coolant, and therefore providing the vane portion is extremely advantageous in terms of enabling forceful ejection of the high-pressure coolant through the ejection port.

In this case, an inner race of the bearing fixed to the outer periphery of the tool attachment portion may include, on the tip end surface side of the tool attachment portion, an extension portion that is not covered by an outer race of the bearing, and the vane portion may be provided on the extension portion of the inner race.

In so doing, the vane portion rotates together with rotation of the inner race fixed to the outer periphery of the tool attachment portion such that the coolant is pushed out toward the tip end surface of the tool attachment portion. Hence, there is no need to provide a power supply for driving the vane portion. Moreover, since the vane portion is provided on the extension portion of the inner race, an increase in a number of components can be suppressed.

The tool holder described above may further include a blocking portion that prevents the coolant from flowing out of a space between the cover and the tool attachment portion such that the space is filled with the coolant in a pressurized condition.

By preventing the coolant from flowing out of the space between the cover and the tool attachment portion using the blocking portion in this manner, the pressurized coolant filling the space can function as a damper to dampen vibration and chatter by the tool attachment portion, and as a result, a reduction in machining precision and wear on the tool can be prevented. Note that the reason why the coolant filling the space between the cover and the tool attachment portion functions as a damper is that the cover is prevented from co-rotating with the tool attachment portion by the stopper, and therefore the cover remains stationary such that the tool holder and the cover are independent of each other.

In the tool holder described above, the ejection port is preferably provided in a plurality around the through hole in the bottom surface, and the respective ejection ports preferably have different incline angles relative to the tool axial center direction.

By providing the plurality of ejection ports at different incline angles relative to the tool axial center direction in this manner, the coolant can be ejected in a plurality of directions, with the result that the coolant can be supplied over a wide range. Therefore, when the coolant is blocked by the work piece so that the coolant cannot easily be supplied to the work part, the coolant ejected through one of the ejection ports can reach the work part.

Further, during machining using a drill or a tap, cutting oil cannot be supplied directly to a work part in an interior of a hole formed in the work piece, and therefore the coolant must be ejected toward a gap between a peripheral edge of the hole in a surface of the work piece and the tool so that the coolant is supplied to the interior of the hole through the gap. When the tool is a drill or a tap, however, the tool holder gradually approaches the work piece as the work progresses, and therefore a position in which the coolant lands on the work piece does not remain constant. By providing the plurality of ejection ports at different incline angles relative to the tool axial center direction, however, the coolant ejected through one of the ejection ports can always reach the gap between the peripheral edge of the hole in the surface of the work piece and the tool. Therefore, coolant can always be supplied to the interior of the hole through the gap, whereby the work part in the interior of the hole can be cooled and discharge of swarf (chips) can be promoted.

In the tool holder described above, the ejection port may be formed by connecting a circular portion to an elongated hole portion that has a width which is smaller than a diameter of the circular portion and extends from the circular portion in a direction heading away from the through hole, and an incline angle of the elongated hole portion relative to a tool center direction may be larger than an incline angle of the circular portion relative to the tool center direction.

By employing an ejection port having this shape, a jet of coolant ejected through the circular portion so as to drip down comparatively along the tool is pushed toward the tool by the coolant ejected through the elongated hole portion, and therefore the coolant can be supplied to the tool over a wide range. Accordingly, the number of ejection ports can be reduced, leading to a reduction in an overall opening surface area of the ejection ports, and as a result, a reduction in the pressure of the coolant ejected through the ejection ports can be suppressed.

In the tool holder described above, the cover is preferably configured such that at least the bottom surface can be attached and detached freely.

The position of the ejection port in the bottom surface of the cover, the diameter of the ejection port, and the incline angle of the ejection port relative to the tool axial center direction are preferably varied in accordance with dimensions of the tool (in particular a length of the tool), the type of the tool, working conditions, and so on. Hence, by configuring the bottom surface of the cover, in which the ejection port is provided, to be freely attachable and detachable, a cover having a suitable ejection port can be attached to the tool holder, with the result that the coolant can be supplied toward the work part even more effectively.

A machine tool according to the present invention includes the tool holder described above.

The machine tool includes the tool holder described above, and therefore the effect of centrifugal force on the ejected coolant can be greatly suppressed, and the need to provide an oil feeding hole in the interior of the tool can be eliminated.

According to the present invention, the cover is attached so as to cover the outer periphery and the tip end surface of the tool attachment portion, the cover is prevented from co-rotating with the rotation of the tool holder (the tool attachment portion) by the bearing and the stopper, and the coolant is ejected through the ejection port provided in the bottom surface of the cover, and therefore the effect of centrifugal force on the ejected coolant can be suppressed greatly. As a result, the coolant can be supplied to a desired position.

Further, since the coolant is ejected through the ejection port provided in the bottom surface of the cover, there is no need to provide an oil feeding hole in the interior of the tool, in contrast to a conventional cutter through method.

Moreover, the through hole penetrated by the tool is provided in the bottom surface of the cover, and the coolant is ejected through the ejection port disposed on the periphery of the through hole, and therefore the ejection port can be positioned close to the work part. As a result, the coolant can be supplied precisely to the work part.

BRIEF DESCRIPTION OF THE DRAWINGS

FIG. 1 is a view showing an example of a configuration of a tool holder according to a first embodiment, wherein FIG. 1A is an overall sectional view of the tool holder, and FIG. 1B is a view showing in detail a structure for enclosing a bearing;

FIG. 3 is a view showing an example of an arrangement of an ejection port through which cutting oil is ejected, wherein FIG. 3A is a plan view, FIG. 3B is a B-B sectional view of FIG. 3A, FIG. 3C is a C-C sectional view of FIG. 3A, and FIG. 3D is a D-D sectional view of FIG. 3A;

FIG. 5 is a view showing an example of a configuration of an outer race in which a third flow passage is provided, wherein FIG. 5A is a sectional view, FIG. 5B is a view seen from a direction E in FIG. 5A, and FIG. 5C is a view seen from a direction F in FIG. 5B;

FIG. 8 is a view illustrating a relationship between an outer diameter of the whirl-stop ring and a stroke of an air cylinder, wherein FIG. 8A shows a case in which a tool attachment portion has a small diameter and FIG. 8B shows a case in which the tool attachment portion has a large diameter;

FIG. 9 is a view showing another example of a configuration of a cover including an ejection port, wherein FIG. 9A is a plan view and FIG. 9B is an H-H sectional view of FIG. 9A;

FIG. 10 is a view showing an example of a configuration of a tool holder according to a second embodiment, wherein FIG. 10A is a sectional view showing an outline of the tool holder, and FIG. 10B is an enlarged view of a part I in FIG. 10A;

FIG. 11 is a view showing an example of a configuration of a rectifying member provided in a first flow passage of the tool holder, wherein FIG. 11A is a plan view and FIG. 11B is a J-J sectional view of FIG. 11A.

BEST MODES FOR CARRYING OUT THE INVENTION

Embodiments of the present invention will be described below in accordance with the attached drawings. Note, however, that unless specific description is provided to the contrary, dimensions, materials, shapes, relative arrangements, and so on of constituent components described in the embodiments are not intended to limit the scope of the present invention, and are merely illustrative examples.

First Embodiment

Figure 1:
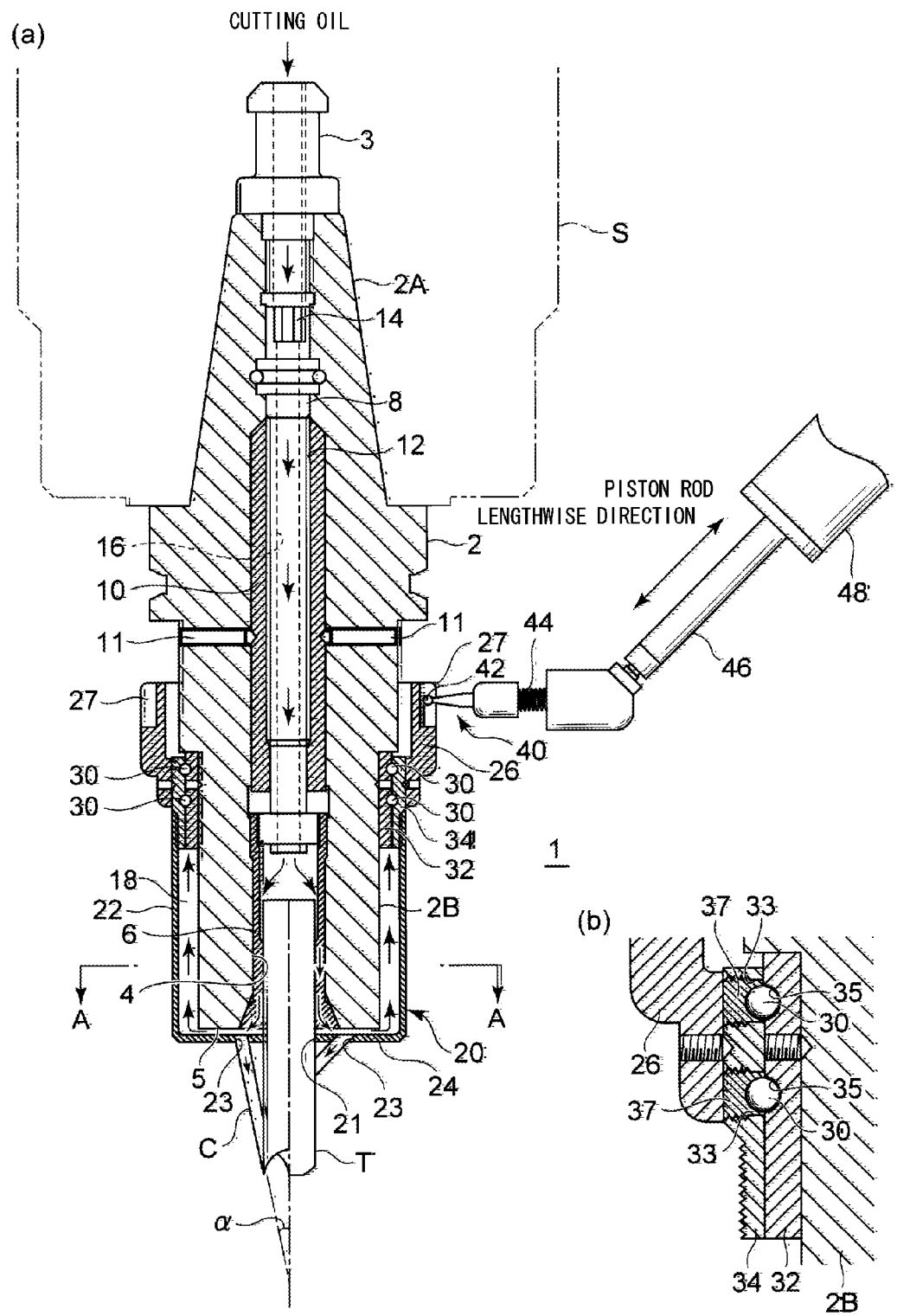
Figure 2:
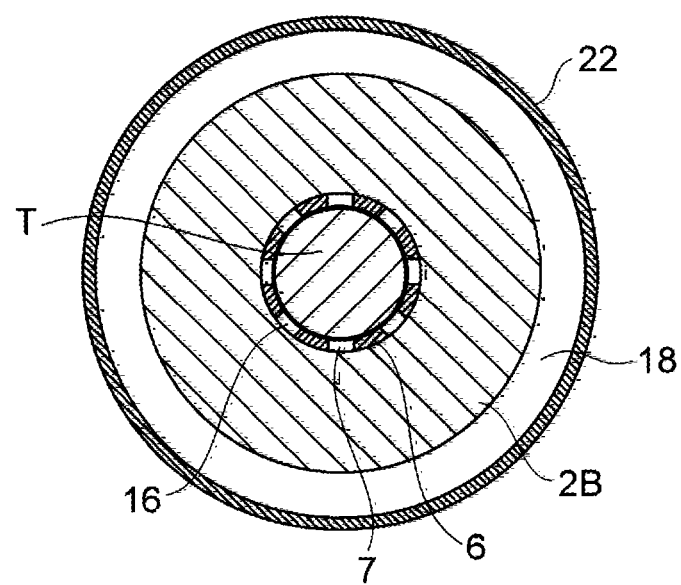
FIG. 2 is an A-A sectional view of FIG. 1A.
Figure 3:
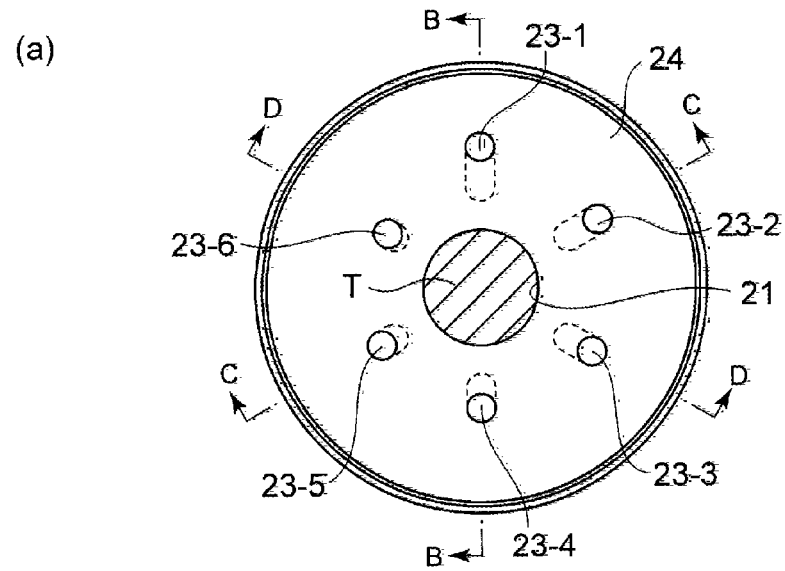
Figure 3:
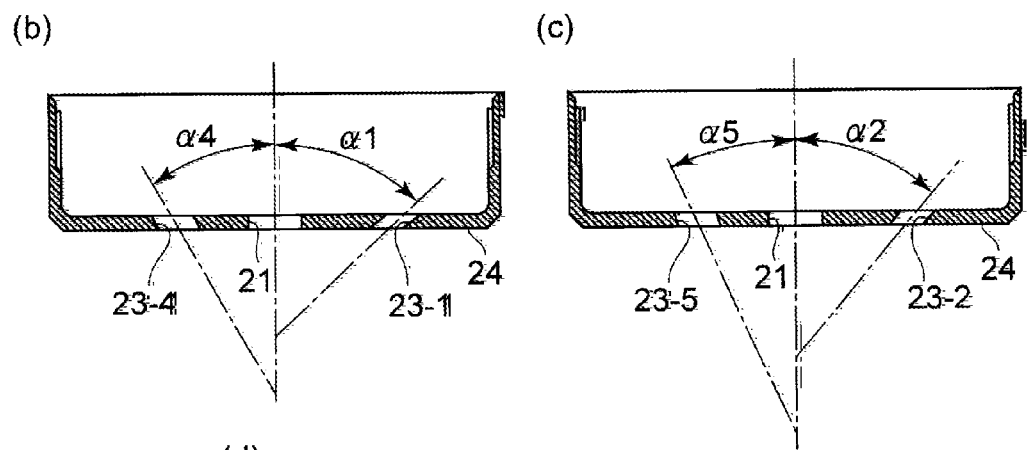
Figure 3:
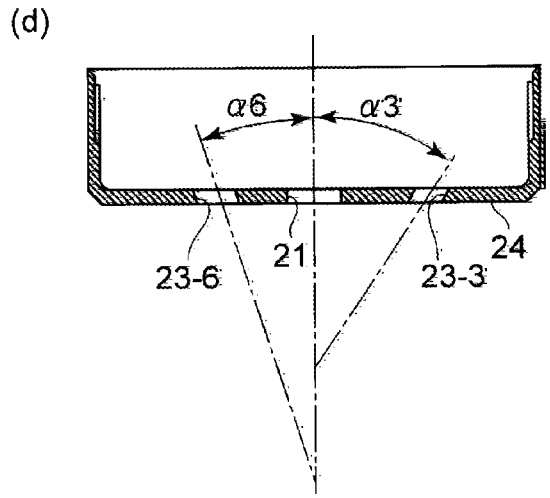

FIG. 1 is a view showing an example of a configuration of a tool holder according to a first embodiment, wherein FIG. 1A is an overall sectional view of the tool holder, and FIG. 1B is a view showing in detail a structure for enclosing a bearing. FIG. 2 is an A-A sectional view of FIG. 1A. FIG. 3 is a view showing an example of an arrangement of an ejection port through which cutting oil is ejected, wherein FIG. 3A is a plan view, FIG. 3B is a B-B sectional view of FIG. 3A, FIG. 3C is a C-C sectional view of FIG. 3A, and FIG. 3D is a D-D sectional view of FIG. 3A.

As shown in FIG. 1A, a tool holder 1 is used to attach a tool T to a main shaft (a spindle) S, and includes a milling chuck main body 2, a cover 20, a bearing 30, and a stopper 40.

A shank portion 2A that is gripped by the main shaft S is provided on a base end side of the milling chuck main body 2. The shank portion 2A is a so-called BT (bottle grip taper) shank in which a pull stud 3 is screwed to an end portion thereof. Further, a draw bar (not shown) is provided in an interior of the main shaft S to be capable of moving in an axial direction thereof. By operating the draw bar such that the pull stud 3 is drawn to the main shaft S side, the tool holder 1 (the milling chuck main body 2) is fixed to the main shaft S.

Note that an HSK shank, a KM shank, an NT shank, or a shank of any other desired shape may be used instead of a BT shank as the shank portion 2A.

A tool attachment portion 2B having an insertion port 4 that opens onto a tip end surface 5 of the milling chuck main body 2 is provided on a tip end side of the milling chuck main body 2. The tool T is inserted into the insertion port 4 of the tool attachment portion 2B and fixed by a fastening force of a collet 6. The tool T is fixed by the collet 6 as follows.

As shown in FIG. 2, the collet 6 is provided with a plurality of slits 7, and a part of a contact surface thereof that contacts an inner wall of the insertion port 4 of the tool attachment portion 2B is tapered (see FIG. 1A). Therefore, the collet 6 decreases in diameter while moving toward the main shaft S side and increases in diameter while moving in an opposite direction.

A fastening bolt 8 is screwed to one end of the collet 6 such that the collet 6 and the fastening bolt 8 are integrated. Further, a fastening nut 10 is fixed in an interior of the milling chuck main body 2 by a fastening nut fixing bolt 11. A male screw of the fastening bolt 8 and a female screw of the fastening nut 10 are screwed together in a screw portion 12.

When the tool T is to be attached to the milling chuck main body 2, a fastening bolt hexagonal portion 14 provided on an end portion of the fastening bolt 8 is rotated by a dedicated hexagonal wrench such that the fastening bolt 8 is caused to retreat (move to the main shaft S side) in the axial direction thereof. As a result, the collet 6 moves to the main shaft S side together with the fastening bolt 8, thereby decreasing in diameter so as to grip the tool T.

When the tool T is to be detached from the milling chuck main body 2, on the other hand, the fastening bolt hexagonal portion 14 is rotated in an opposite direction. As a result, the collet 6 moves to the opposite side to the main shaft S together with the fastening bolt 8, thereby increasing in diameter so as to release its grip on the tool T.

The cover 20 is configured to have an overall cup shape, and as shown in FIG. 1A, includes a tubular wall 22 covering an outer periphery of the tool attachment portion 2B, and a bottom surface 24 covering the tip end surface 5 of the tool attachment portion 2B. The tubular wall 22 is formed in a cylindrical shape including an outer race 34 of the bearing 30.

A through hole 21 penetrated by the tool T, and an ejection port 23 disposed on a periphery of the through hole 21, through which a cutting fluid C is ejected, are provided in the bottom surface 24 of the cover 20. The ejection port 23 is inclined relative to a tool axial center direction so as to come steadily closer to an outer peripheral surface of the tool T while heading away from the main shaft S, and an incline angle α thereof is preferably adjusted appropriately so that the cutting oil C can be supplied to a desired position of the tool T.

Further, as shown in FIG. 3, a plurality of ejection ports 23 (23-1, 23-2, . . . , 23-6) may be provided at respectively different incline angles α (α1, α2, . . . , α6) relative to the tool axial center direction. For example, the incline angles α may be set such as α1=45°, α2=40°, α3=35°, α4=30°, α5=25°, and α6=20°.

By providing the plurality of ejection ports 23 (23-1, 23-2, . . . , 23-6) at different incline angles α relative to the tool axial center direction in this manner, the cutting oil C can be ejected in a plurality of directions, with the result that the cutting oil C can be supplied over a wide range. Therefore, when the cutting oil C is blocked by a work piece so that the cutting oil C cannot easily be supplied to the work part, the cutting oil C ejected through one of the ejection ports 23 can reach the work part.

Note that the incline angles α of the respective ejection ports 23 are preferably adjusted in accordance with a length of the tool T, and in a case where a plurality of types of tools T having different lengths are handled, covers 20 including ejection ports 23 with incline angles α that correspond to the lengths of the respective tools T are preferably prepared in advance.

Further, during machining using a drill or a tap, cutting oil cannot be supplied directly to a work part in an interior of a hole formed in the work piece, and therefore the cutting oil must be ejected toward a gap between a peripheral edge of the hole in a surface of the work piece and the tool so that the cutting oil is supplied to the interior of the hole through the gap. When the tool T is a drill or a tap, however, the tool holder 1 (the bottom surface 24 of the cover 20) gradually approaches the work piece as the work progresses, and therefore a position in which the cutting oil C ejected through the ejection port 23 lands on the work piece does not remain constant. By providing the plurality of ejection ports 23 (23-1, 23-2, ..., 23-6) at different incline angles α relative to the tool axial center direction, however, the cutting oil C ejected through one of the ejection ports 23 can always reach the gap between the peripheral edge of the hole in the surface of the work piece and the tool. Therefore, cutting oil can always be supplied to the interior of the hole through the gap, whereby the work part in the interior of the hole can be cooled and discharge of swarf (chips) can be promoted.

The cover 20 is preferably configured such that at least the bottom surface 24 can be attached and detached freely. For example, the bottom surface 24 and a part of the tubular wall 22 (a part of the tubular wall 22 other than the outer race 34) may be configured to be screwable to the outer race 34 by a screw portion 38 (see FIG. 4).

A position, a diameter, and the incline angle relative to the tool axial center direction of the ejection port 23 in the bottom surface 24 are preferably varied in accordance with dimensions of the tool T (in particular, the length of the tool T), the type of the tool T, working conditions, and so on. Hence, when at least the bottom surface 24 is configured to be freely attachable and detachable, the cutting oil C can be supplied toward the work part more effectively using the bottom surface 24 (and the part of the tubular wall 22) having the ejection port 23 that is suitable for use with the corresponding tool T by exchanging the part including the bottom surface 24.

A first flow passage 16 is formed in respective interiors of the shank portion 2A and the tool attachment portion 2B such that the cutting oil C is led between the tip end surface 5 of the tool attachment portion 2B and the bottom surface 24 of the cover 20 from the main shaft S side through the first flow passage 16. As shown by an arrow in FIG. 1, the first flow passage 16 is constituted by an internal flow passage of the pull stud 3 and the fastening bolt 8, and the slits 7 (see FIG. 2) of the collet 6. Note that apart of the cutting oil C led between the tip end surface 5 of the tool attachment portion 2B and the bottom surface 24 of the cover 20 through the first flow passage 16 is ejected toward the tool T through the ejection port 23, while the remainder is supplied to the bearing 30 through a second flow passage 18, to be described below.

By providing the first flow passage 16 through which the cutting oil C supplied from the main shaft S side flows in the respective interiors of the shank portion 2A and the tool attachment portion 2B in this manner, a flow passage for the cutting oil C extending from the main shaft S to the ejection port 23 is connected simply by attaching the tool holder 1 to the main shaft S. As a result, the tool holder 1 can be applied to an exchange operation by an ATC (Automatic Tool Changer) easily.

The bearing 30 is a ball bearing in which a plurality of balls are enclosed between an inner race 32 fixed to an outer periphery of the tool attachment portion 2B and the outer race 34 constituting a part of the tubular wall 22 of the cover 20. The inner race 32 of the bearing 30 rotates at high speed together with the milling chuck main body 2. Meanwhile, a whirl-stop ring 26 attached to the outer race 34 of the bearing 30 is restrained by the stopper 40, to be described below, and therefore the outer race 34 remains stationary.

The bearing 30 is enclosed as follows. First, an R groove 35 is formed on an inner peripheral side of the outer race 34 in a condition where a plug bolt 37 is screwed into a bearing inlet hole 33 provided in the outer race 34. The plug bolt 37 is then removed, whereupon the outer race 34 is attached to the inner race 32 and the bearing 30 is introduced into the R groove 35 between the inner race 32 and the outer race 34 through the bearing inlet hole 33. The bearing inlet hole 33 is then plugged by the plug bolt 37 having the R groove 35 formed in a tip end thereof. As a result, the bearing 30 is enclosed in the R groove 35 between the inner race 32 and the outer race 34. Note that a male screw formed on the plug bolt 37 and a female screw formed in the bearing inlet hole 33, to which the male screw is screwed, are provided only on a base end side of the plug bolt 37 and an outer peripheral side of the outer race 34 such that when the plug bolt 37 is screwed into the bearing inlet hole 33, a position of the plug bolt 37 is restricted. Thus, a gap between the bearing 30 and the R groove 35 in the plug bolt 37 can be adjusted with a high degree of precision.

Further, the second flow passage 18, through which a part of the cutting oil C led between the tip end surface 5 of the tool attachment portion 2B and the bottom surface 24 of the cover 20 via the first flow passage 16 flows toward the bearing 30, is provided between the tubular wall 22 and the outer periphery of the tool attachment portion 2B. The cutting oil C supplied to the bearing 30 through the second flow passage 18 cools and lubricates the bearing 30 so as to prevent seizure of the bearing 30.

Hence, seizure does not occur in the bearing 30 even when the tool T is rotated at high speed, and therefore a stable machining operation can be performed. The inventor has confirmed in actuality that seizure does not occur in the bearing 30 under a tool rotation speed condition of approximately 20,000 rpm when the aqueous cutting oil C is supplied to the bearing 30 through the second flow passage 18.

Figure 4:
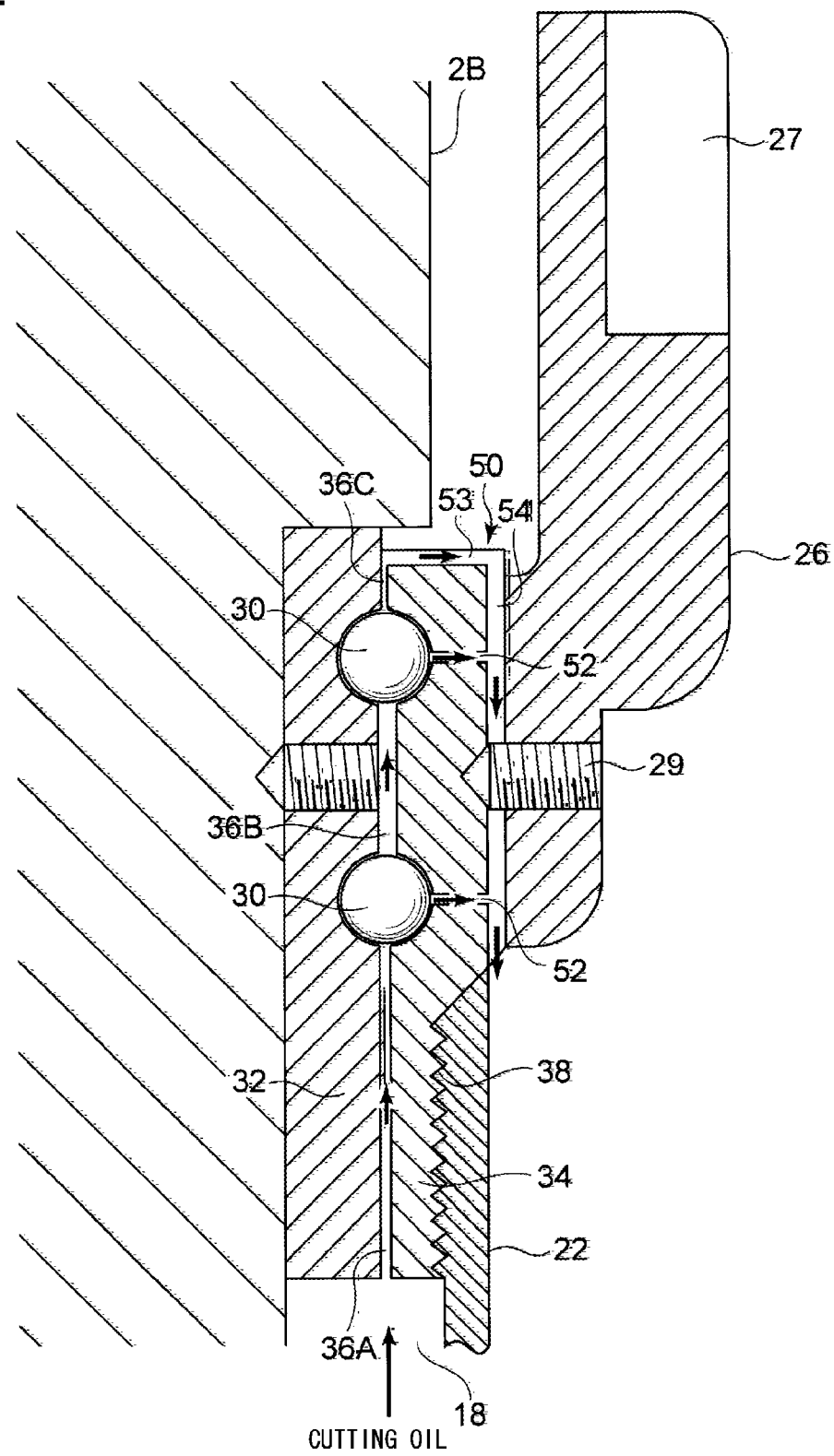
FIG. 4 is a sectional view showing a structure of a cutting oil flow passage around the bearing.

A flow of the cutting oil C around the bearing 30 will now be described in detail. FIG. 4 is a sectional view showing a structure of a cutting oil flow passage around the bearing 30.

As shown in the drawing, a gap 36 (36A, 36B, 36C) is provided between the inner race 32 and the outer race 34 over an entire circumference thereof. The cutting oil passing through the second flow passage 18 between the tubular wall 22 and the outer periphery of the tool attachment portion 2B cools and lubricates the bearing 30 while flowing through the gap 36 (36A, 36B, 36C). After cooling and lubricating the bearing 30, the cutting oil is discharged through a third flow passage 50, as shown by an arrow in FIG. 4. The third flow passage 50 is constituted by a communicating hole 52 through which the cutting oil flows outward in a radial direction from the R groove enclosing the bearing 30, an upper surface groove 53 through which the cutting oil flows outward in the radial direction after passing through the gap 36C so as to reach an upper surface of the outer race 34, and a through hole 54 in which the cutting oil from the communicating hole 52 and the cutting oil from the upper surface groove 53 converge before being discharged downward.

By providing the third flow passage 50 to promote discharge of the cutting oil C following cooling and lubrication of the bearing 30, stagnation of the cutting oil C on the periphery of the bearing 30 can be prevented such that fresh cutting oil C is always supplied to the bearing 30, with the result that cooling and lubrication can be performed efficiently. Further, the cutting oil C flows gently from the bearing 30 toward the outside through the third flow passage 50, and therefore intermixing of air bubbles from the outside as the bearing 30 rotates can be prevented. Moreover, even when foreign matter becomes intermixed in the cutting oil for some reason, the foreign matter can be discharged to the outside reliably so as not to impair the functions of the bearing 30.

A width of the gap 36B sandwiched between the bearings 30 on two rows is preferably set to be greater than respective widths of the other gaps 36A and 36C. As a result, the cutting oil C can be supplied to the bearings 30 on a second row (the bearings 30 on an upper side in FIG. 4) with stability. Further, by making the width of the gap 36C that serves as a flow passage immediately after the bearings 30 on the second row the smallest width in the gap 36 (36A, 36B, 36C) such that the cutting oil flows through the communicating hole 52 at a sufficient pressure, stagnation in the bearing 30 can be prevented such that cooling and lubrication can be performed with increased efficiency, while intermixing of air bubbles can be prevented and discharge of foreign matter can be promoted effectively. For example, the width of the gap 36B may be set at approximately 0.5 mm, the width of the gap 36A may be set at approximately 0.2 mm, and the width of the gap 36C may be set at approximately 0.05 mm.

Note that widths (or diameters) of the communicating hole 52, the upper surface groove 53, and the through hole 54 are preferably set to be greater than the width of the gap 36A that serves as a flow passage immediately before the bearings 30 on a first row (in other words, a flow passage width on an inlet side of the third flow passage 50). As a result, discharge of the cutting oil following cooling and lubrication of the bearing 30 can be promoted, and stagnation of the cutting oil on the periphery of the bearing 30 can be prevented such that fresh cutting oil is supplied to the bearing 30 at all times, whereby cooling and lubrication can be performed more efficiently. For example, the diameter of the communicating hole 52 may be set at approximately 0.3 mm, and the respective widths (diameters) of the upper surface groove 53 and the through hole 54 may be set at approximately 0.5 mm.

Further, the outer race 34 and the whirl-stop ring 26 may be configured as separate bodies, and the third flow passage 50 may be formed in the outer race 34 alone. As shown in FIG. 4, for example, the whirl-stop ring 26 may be attached detachably to the outer periphery of the outer race 34, in which the third flow passage 50 is formed in advance, using a set screw 29.

By providing the outer race 34 separately from the whirl-stop ring 26, when the outer race 34 or the whirl-stop ring 26 is damaged or broken, the damaged or broken component alone can be replaced selectively.

Figure 5:
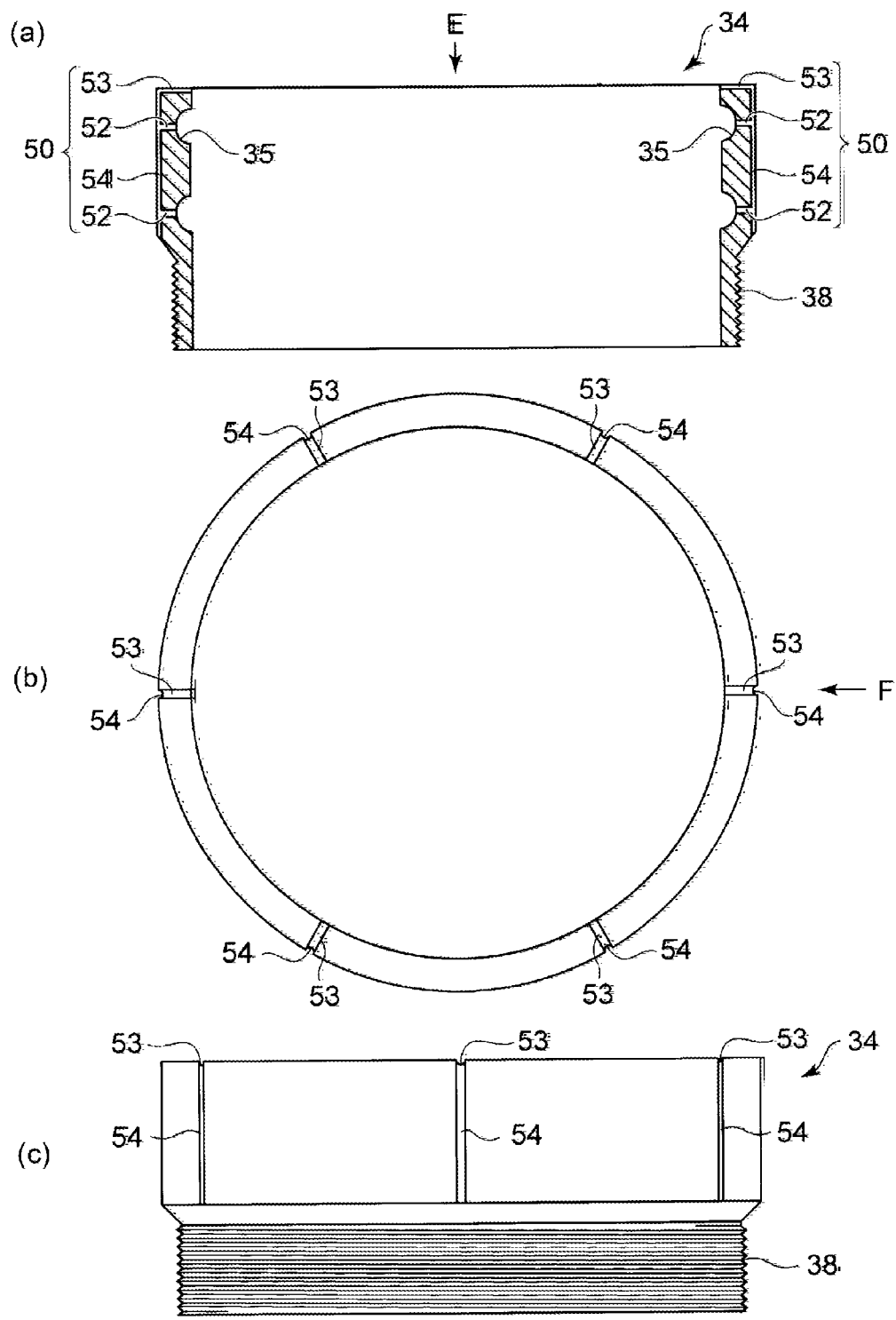

Further, by forming the third flow passage 50 only in the outer race 34, machining can be performed easily, enabling a reduction in manufacturing cost. This will now be described using FIG. 5. FIG. 5 is a view showing an example of a configuration of the outer race 34 in which the third flow passage 50 is provided, wherein FIG. 5A is a sectional view, FIG. 5B is a view seen from a direction E in FIG. 5A, and FIG. 5C is a view seen from a direction F in FIG. 5B.

The third flow passage 50 constituted by the communicating hole 52, the upper surface groove 53, and the through hole 54 is provided in a plurality (in six locations at sixty-degree intervals, for example) in a circumferential direction. The communicating hole 52 communicating with the R groove 35 that guides the bearing 30 can be formed easily by performing hole punching from the outer peripheral side of the outer race 34. Further, the upper surface groove 53 and the through hole 54 can be formed easily by performing cutting on an upper surface or an outer peripheral surface of the outer race 34. Hence, in comparison with a case where the third flow passage 50 is formed in the integrally provided outer race 34 and whirl-stop ring 26, machining of the third flow passage 50 can be performed easily, enabling a reduction in manufacturing cost.

As shown in FIG. 1A, the stopper 40 includes a whirl-stop pin 42 that engages with a recessed portion 27 provided in an outer periphery of the whirl-stop ring 26, a piston rod 46 that supports the whirl-stop pin 42 via a spring 44, and an air cylinder 48 that causes the piston rod 46 to advance and retreat. Note that the air cylinder 48 may be fixed to a Z axis on the machine tool side.

When the piston rod 46 is moved in a lengthwise direction thereof by driving force from the air cylinder 48 such that the whirl-stop pin 42 is inserted into the recessed portion 27 of the whirl-stop ring 26, the whirl-stop ring 26 is latched. Note that the piston rod 46 is disposed above the whirl-stop ring 26 such that the lengthwise direction thereof is diagonal relative to the axial center direction of the tool T, and therefore interference between the work piece and the piston rod 46 and air cylinder 48 can be prevented.

Figure 6:
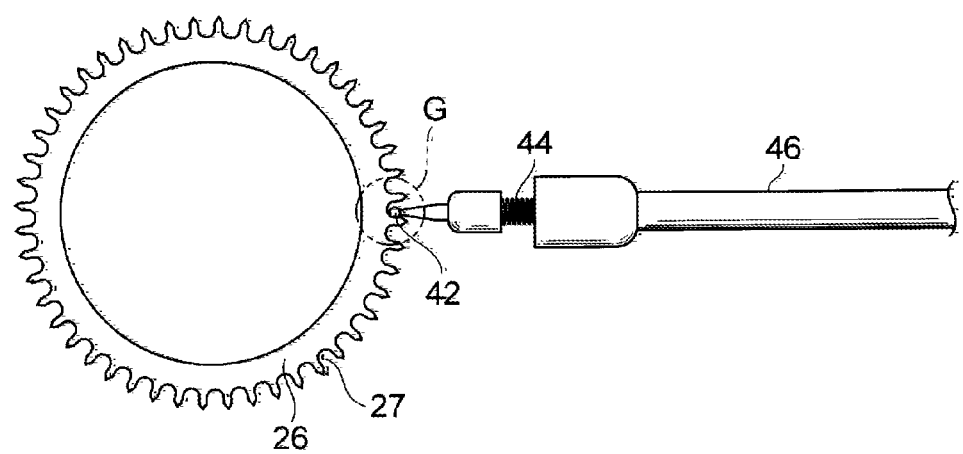
FIG. 6 is a view showing a manner in which a whirl-stop ring is restrained by a stopper.
Figure 7:
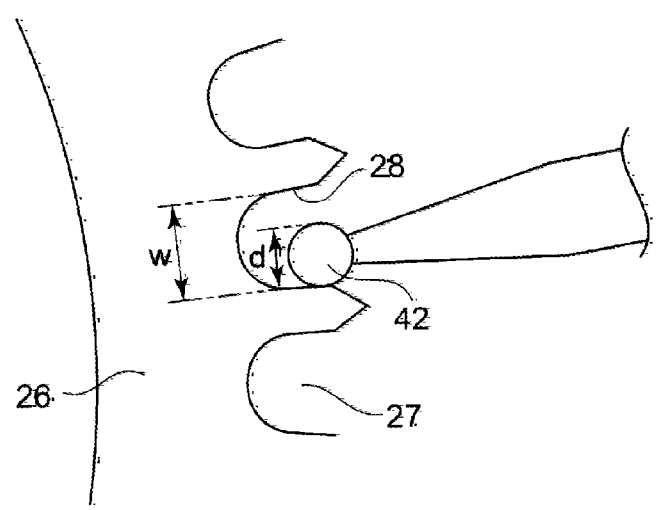
FIG. 7 is an enlarged view of a region indicated by a reference symbol G in FIG. 6.

FIG. 6 is a view showing a manner in which the whirl-stop ring 26 is restrained by the stopper 40. FIG. 7 is an enlarged view of a region indicated by a reference symbol G in FIG. 6.

As shown in FIG. 6, the recessed portion 27 is provided in the outer periphery of the whirl-stop ring 26 in a large number over the entire circumference of the whirl-stop ring 26. A width W (see FIG. 7) of the recessed portion 27 in the circumferential direction of the whirl-stop ring 26 is set to be greater on an outer peripheral side than an inner peripheral side so that the whirl-stop pin 42 can be inserted into the recessed portion 27 easily. Further, the spring 44 is provided on a base end side of the whirl-stop pin 42, and therefore, when the whirl-stop pin 42 pressed against the outer periphery of the whirl-stop ring 26 deviates slightly from a position of the recessed portion 27, the spring 44 bends such that the whirl-stop pin 42 enters the recessed portion 27. Moreover, a tip end of the whirl-stop pin 42 is spherical, and therefore the whirl-stop pin 42 enters the recessed portion 27 smoothly without becoming caught on an outer surface of the whirl-stop ring 26. Hence, the tool holder 1 can be applied to an exchange operation by an ATC (Automatic Tool Changer) easily.

Further, a circumferential direction gap between the recessed portion 27 and the whirl-stop pin 42 (in other words, a difference between the width W of the recessed portion 27 and a diameter D of the tip end of the whirl-stop pin 42) in a condition where the whirl-stop pin 42 is engaged with the recessed portion 27 is preferably no smaller than 0.1 mm and no larger than 0.5 mm.

By making the circumferential direction gap between the recessed portion 27 of the whirl-stop ring 26 and the whirl-stop pin 42 in the engaged condition no smaller than 0.1 mm, the whirl-stop pin 42 can be inserted into the recessed portion 27 easily. By making the gap no larger than 0.5 mm, meanwhile, it is possible to avoid situations in which the whirl-stop ring 26 rotates when a tool such as a tap is rotated in reverse such that the cutting oil C ejected through the ejection port 23 is affected by centrifugal force, or the whirl-stop pin 42 collides with a wall surface 28 of the recessed portion 27 such that an impact is generated.

Further, an outer diameter of the whirl-stop ring 26 provided with the recessed portion 27 may be made substantially constant, regardless of the diameter of the tool attachment portion 2B.

Figure 8:
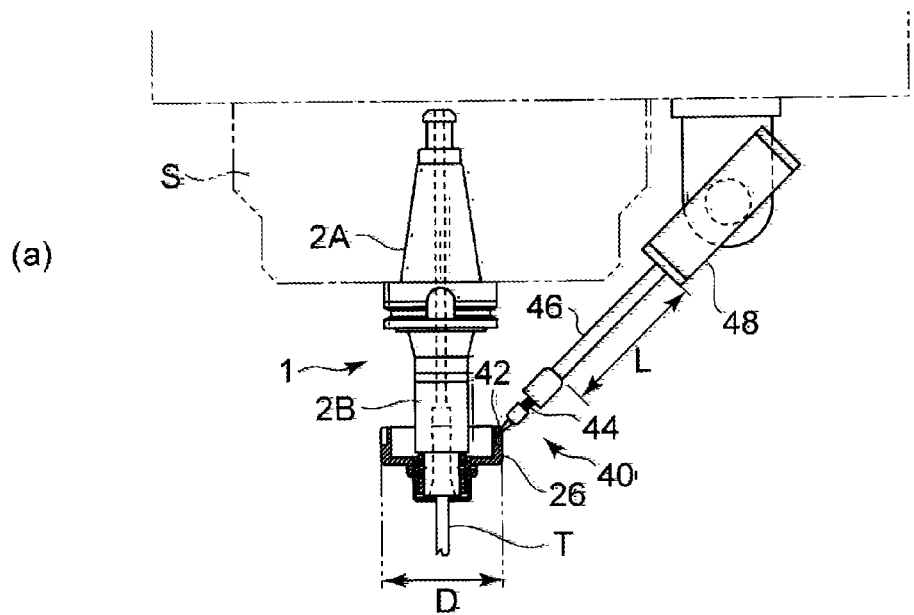
Figure 8:
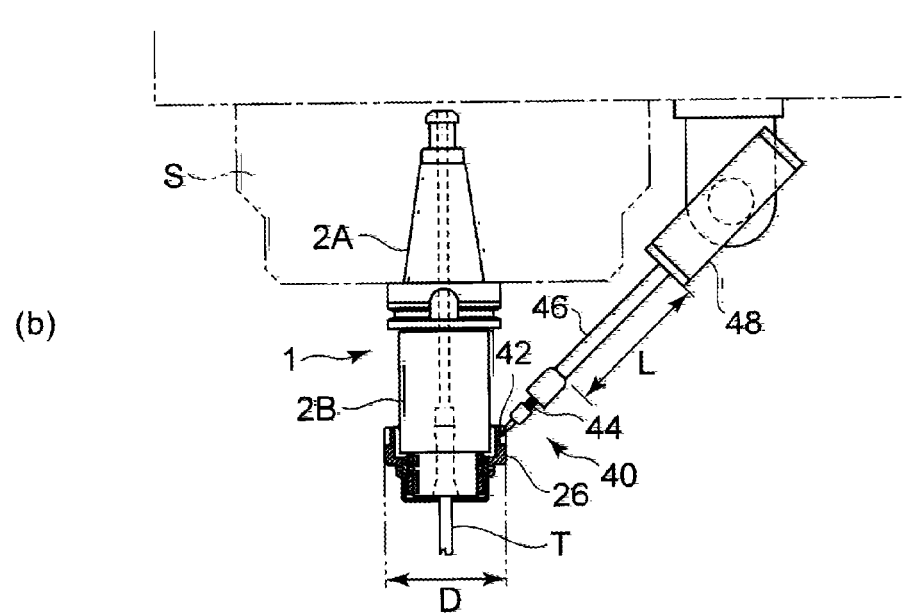

FIG. 8 is a view illustrating a relationship between the outer diameter of the whirl-stop ring 26 and a stroke of the air cylinder 48, wherein FIG. 8A shows a case in which the tool attachment portion 2B has a small diameter and FIG. 8B shows a case in which the tool attachment portion 2B has a large diameter.

As shown in FIGS. 8A and 8B, by making an outer diameter D of the whirl-stop ring 26 substantially constant, the whirl-stop pin 42 can be engaged with the recessed portion 27 of the whirl-stop ring 26 when moved by an identical stroke L even if the diameter of the tool attachment portion 2B is different. Hence, even when the tool holder 1 is applied to automatic exchange by an ATC (Automatic Tool Changer), there is no need to modify the stroke of the air cylinder 48 for each tool holder 1. As a result, the tool holder 1 can be applied to automatic exchange by the ATC easily.

In this embodiment, as described above, the cover 20 is attached so as to cover the outer periphery and the tip end surface 5 of the tool attachment portion 2B, the cover 20 is prevented from co-rotating with the rotation of the tool holder 1 (the tool attachment portion 2B) by the bearing 30 and the stopper 40, and the cutting oil C is ejected through the ejection port 23 provided in the bottom surface 24 of the cover 20, and therefore the effect of centrifugal force on the ejected cutting oil C can be suppressed greatly. As a result, the cutting oil C can be supplied to a desired position.

Further, since the cutting oil C is ejected through the ejection port 23 provided in the bottom surface 24 of the cover 20, there is no need to provide an oil feeding hole in the interior of the tool T, in contrast to a conventional cutter through method.

Moreover, the through hole 21 penetrated by the tool T is provided in the bottom surface 24 of the cover 20, and the cutting oil is ejected through the ejection port 23 disposed on the periphery of the through hole 21, and therefore the ejection port 23 can be positioned close to the work part. As a result, the cutting oil can be supplied precisely to the work part.

Note that in this embodiment, an example (see FIGS. 8A and 8B) in which the whirl-stop ring 26 is formed with a substantially constant outer diameter regardless of the diameter of the tool attachment portion 2B in order to make the stroke of the air cylinder 48 constant was described, but a device in which there is no need to modify the stroke of the air cylinder 48 even when a whirl-stop ring 26 having an outer diameter that corresponds to the diameter of the tool attachment portion 2B is used can be realized in a following manner. In so doing, the tool holder 1 can be applied to automatic exchange by an ATC easily, and at the same time, compactness can be achieved in the whirl-stop ring 26.

The stroke of the air cylinder 48 is set in alignment with the tool holder having the tool attachment portion 2B with the smallest diameter (in other words, the tool holder having the whirl-stop ring 26 with the smallest outer diameter), from among the tool holders used by the ATC (Automatic Tool Changer). In other words, the stroke of the air cylinder 48 is set such that the whirl-stop pin 42 reaches the recessed portions 27 of the whirl-stop ring 26 having the smallest outer diameter. This stroke set value is used in common among all of the tool holders used by the ATC (Automatic Tool Changer). When the tool holder having the tool attachment portion 2B with the largest diameter is used and the air cylinder 48 attempts to move the whirl-stop pin 42 by the stroke set value, the spring 44 contracts so as to absorb the surplus stroke. At this time, a natural length and/or a spring constant of the spring 44 is preferably adjusted such that the engagement between the whirl-stop pin 42 and the recessed portion 27 of the whirl-stop ring 26 is not impaired by excessive elastic force when the spring 44 contracts.

Further, in this case, a speed at which the piston rod 46 is extruded by the air cylinder 48 may be set to decrease in stages during an extrusion operation to alleviate an impact occurring upon contact between the whirl-stop pin 42 and the recessed portion 27 of the whirl-stop ring 26. For example, when a stroke at which the whirl-stop pin 42 contacts the recessed portion 27 during use of the tool holder having the tool attachment portion 2B with the largest diameter is set at L0, the extrusion speed of the piston rod 46 may be varied about an arbitrary threshold Lth (<L0). In other words, the extrusion speed of the piston rod 46 may be increased within a stroke range of 0<L<Lth, and reduced within a stroke range of Lth≤L. Thus, even when the tool holder having the tool attachment portion 2B with the largest diameter is used, the extrusion speed of the piston rod 46 is reduced before the whirl-stop pin 42 contacts the recessed portion 27 (i.e. when the stroke reaches the threshold Lth), and therefore the impact occurring upon contact between the whirl-stop pin 42 and the recessed portion 27 of the whirl-stop ring 26 is alleviated.

Furthermore, in this embodiment, an example in which the circular ejection port 23 (see FIG. 3A) is formed in the bottom surface 24 of the cover 20 was described, but the shape of the ejection port 23 is not limited to this example, and the ejection port 23 may take any desired shape.

Figure 9:
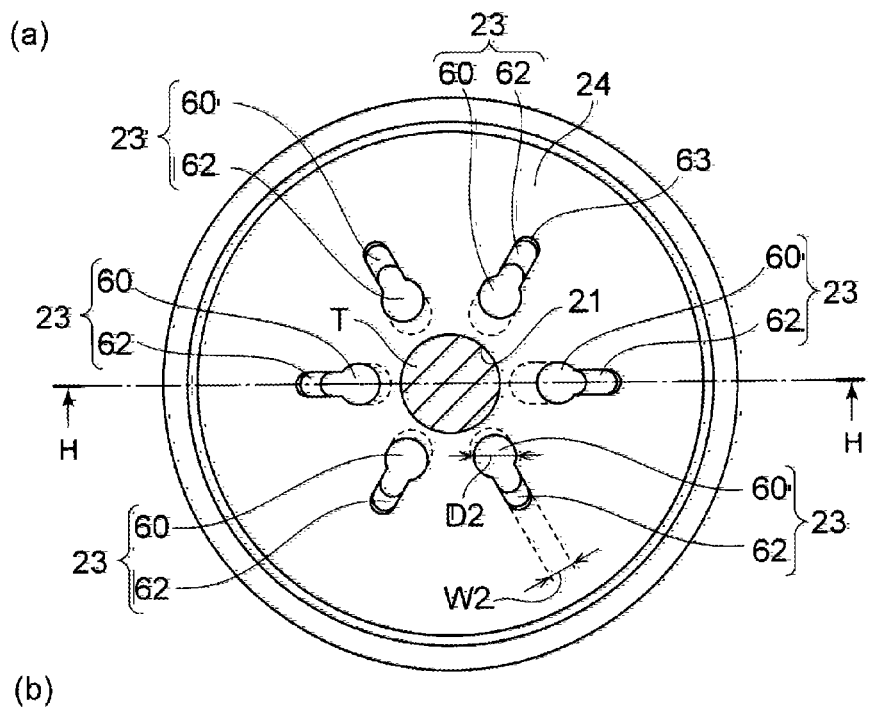
Figure 9:
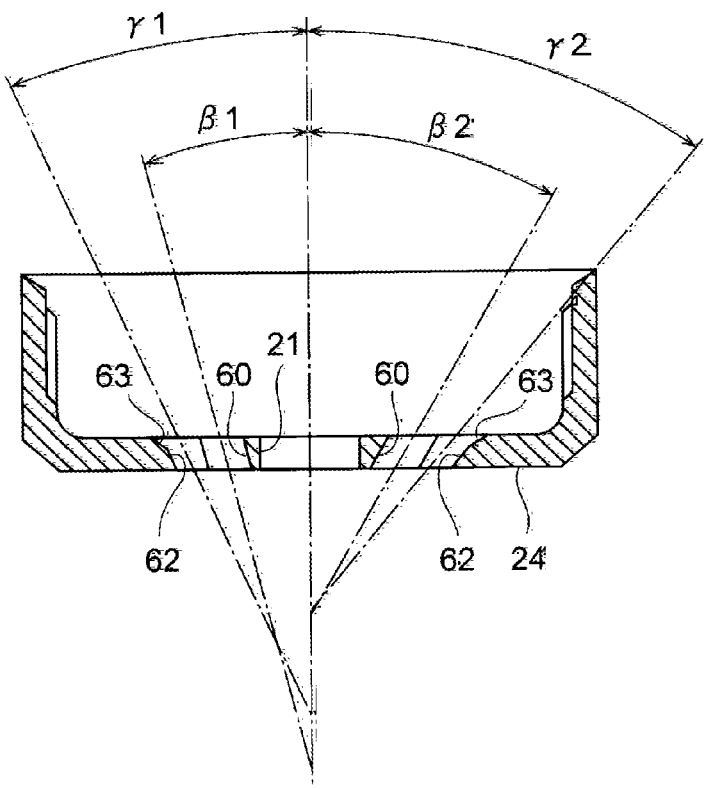

FIG. 9 is a view showing another example of the cover 20 in which the ejection port 23 is formed in a different shape, wherein FIG. 9A is a plan view and FIG. 9B is an H-H sectional view of FIG. 9A. As shown in FIGS. 9A and 9B, the ejection port 23 may have a shape whereby a circular portion 60 is connected to an elongated hole portion 62 that extends from the circular portion 60 in a direction heading away from the through hole 21 penetrated by the tool T. A width W2 of the elongated hole portion 62 is smaller than a diameter D2 of the circular portion 60. Further, incline angles γ1, γ2 of the elongated hole portion 62 relative to a tool center direction are larger than incline angles β1, β2 of the circular portion 60 relative to the tool center direction. Note that a plurality of the ejection ports 23 may be provided in the bottom surface 24 of the cover 20, and the incline angles of the circular portions 60 and elongated hole portions 62 of the respective ejection ports 23 relative to the tool center direction may be varied.

When the ejection port 23 constituted by the circular portion 60 and the elongated hole portion 62 is used, a jet of cutting oil ejected through the circular portion 60 so as to drip down comparatively along the tool T is pushed toward the tool T side by a jet of cutting oil ejected through the elongated hole portion 62, whereby the cutting oil can be supplied to the tool T over a wide range. Accordingly, the number of ejection ports 23 can be reduced, leading to a reduction in an overall opening surface area of the ejection ports 23, and as a result, a reduction in the pressure of the cutting oil ejected through the ejection ports 23 can be suppressed.

Further, a C surface 63 is preferably formed by selectively chamfering a region far from the through hole 21 on a peripheral edge of the elongated hole portion 62 on an inside surface of the bottom surface 24 of the cover 20. In so doing, the pressure of the cutting oil ejected through the elongated hole portion 62 is increased while flowing along the C surface 63 by a resulting sectional area reduction, and therefore a momentum of the cutting oil ejected through the elongated hole portion 62 can be increased.

Furthermore, in this embodiment, an example in which the stopper 40 is configured to facilitate application of the tool holder 1 to automatic exchange by an ATC was described, but as long as the stopper 40 is capable of preventing co-rotation of the cover 20, there are no particular limitations on the configuration thereof, and the stopper 40 may be configured as desired.

Moreover, in this embodiment, an example in which cutting oil is ejected through the ejection port 23 was described, but another coolant, such as mist or air, may be used instead of cutting oil.

Further, in this embodiment, a ball bearing in which balls are enclosed between the inner race 32 and the outer race 34 was cited as an example of the bearing 30, but there are no particular limitations on the bearing 30, and any bearing capable of supporting the whirl-stop ring 26 on the outer peripheral surface of the tool attachment portion 2B to be free to rotate relative thereto may be used.

Furthermore, in this embodiment, an example in which the air cylinder 48 is used to move the whirl-stop pin 42 was described, but any desired actuator, such as a hydraulic cylinder or a motor, may be used instead of the air cylinder 48.

Second Embodiment

Next, a tool holder according to a second embodiment will be described. In the following description, locations shared by the tool holder 1 according to the first embodiment have been allocated identical reference symbols, and description thereof has been omitted. The tool holder according to this embodiment will be described while focusing on differences with the tool holder 1 according to the first embodiment.

Figure 10:
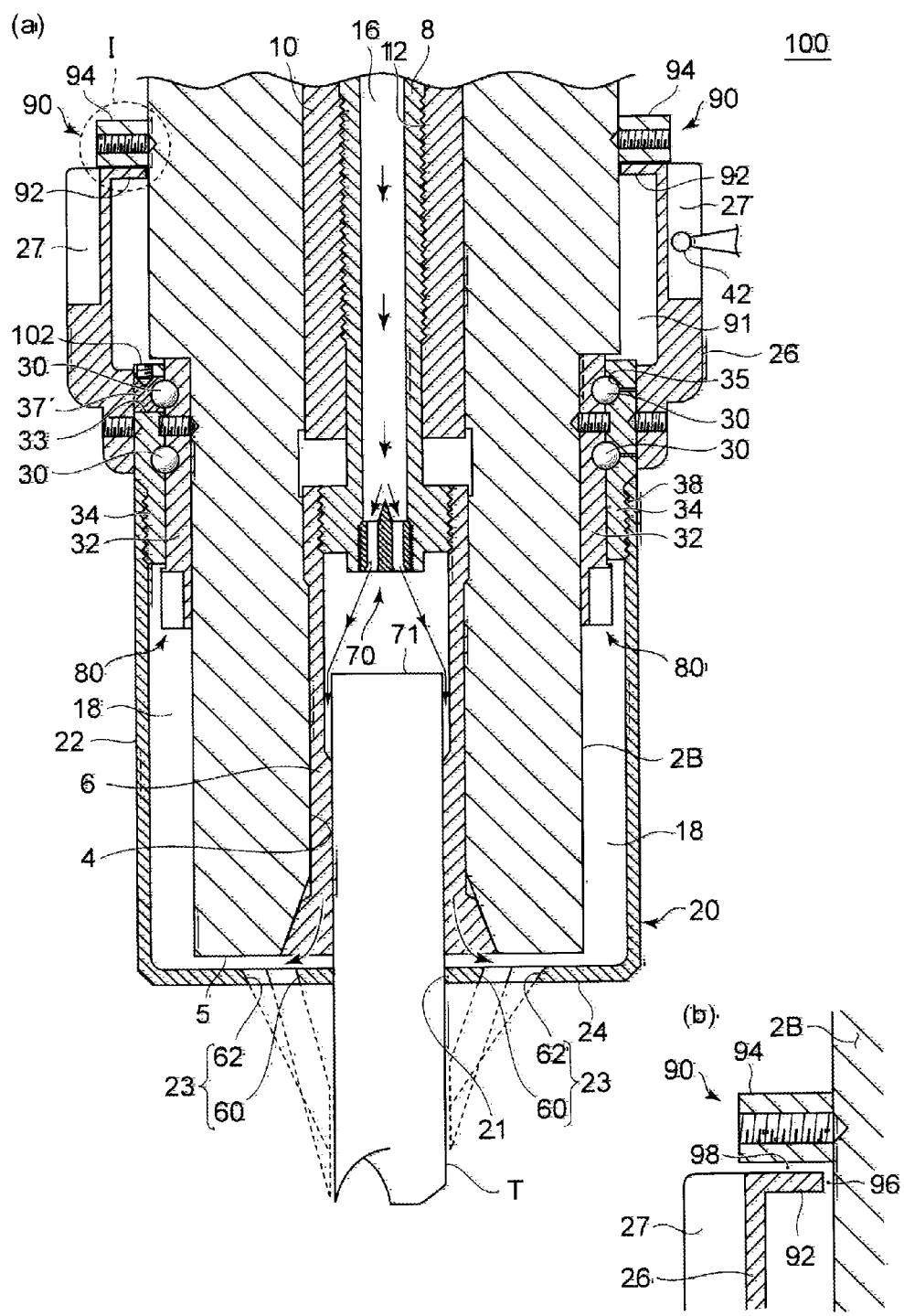
Figure 11:
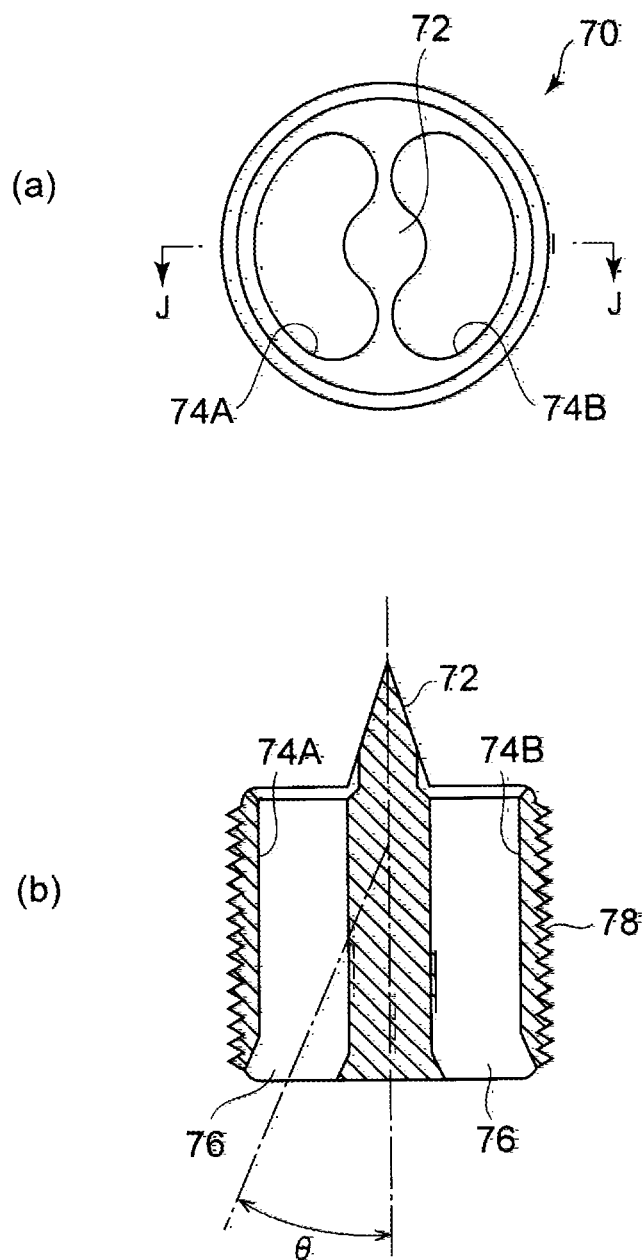
Figure 12:
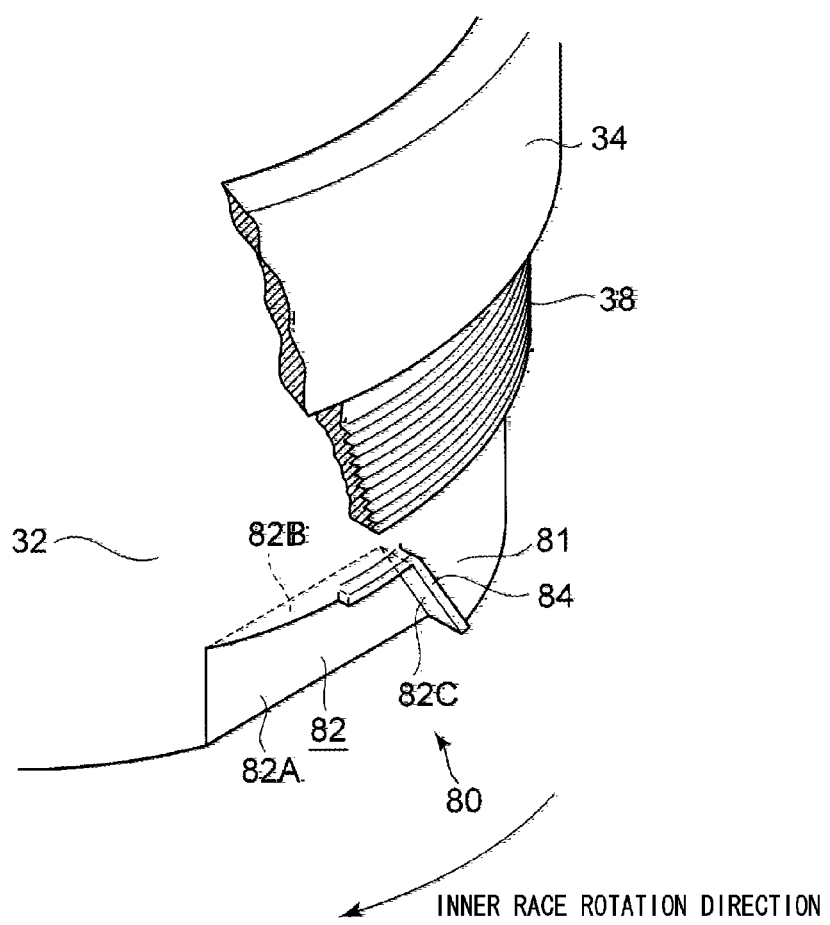
FIG. 12 is a perspective view showing an example of a configuration of a vane portion provided between a cover of the tool holder and an outer periphery of a tool attachment portion.

FIG. 10 is a view showing an example of a configuration of the tool holder according to the second embodiment, wherein FIG. 10A is a sectional view showing an outline of the tool holder according to this embodiment, and FIG. 10B is an enlarged view of a part I in FIG. 10A. FIG. 11 is a view showing an example of a configuration of a rectifying member provided in the first flow passage 16 of the tool holder, wherein FIG. 11A is a plan view and FIG. 11B is a J-J sectional view of FIG. 11A. FIG. 12 is a perspective view showing an example of a configuration of a vane portion provided between the cover 20 of the tool holder and the outer periphery of the tool attachment portion 2B.

As shown in FIG. 10A, in a tool holder 100 according to this embodiment, a rectifying member (a pressure controller) 70 is screwed to the end portion of the fastening bolt 8. As shown in FIGS. 11A and 11B, a pair of substantially ring-shaped through holes 74A, 74B forming a part of the first flow passage 16 are formed in the rectifying member 70 so as to surround a projecting portion 72 that projects in an opposite direction to a coolant (cutting oil, mist, air, or the like) flow direction through the first flow passage 16. Further, the rectifying member 70 is formed in an overall substantially cylindrical shape, and a male screw 78 that is screwed to the female screw formed in the end portion of the fastening bolt 8 is provided on an outer peripheral surface thereof. Outlet portions 76 of the respective through holes 74A, 74B are bent outward in a radial direction of the rectifying member 70. A bend angle θ of the outlet portion 76 relative to a central axis of the rectifying member 70 is adjusted such that the coolant flows toward a gap between a peripheral edge of a rear end surface 71 of the tool T and an inner wall surface of the tool attachment portion 2B (more specifically, an inside surface of the collet 6 or a wall surface of the insertion hole 4 in a position corresponding to the slits 7 in the collet 6).

By providing the rectifying member 70 on an upstream side of the rear end surface 71 of the tool T in the first flow passage 16 in this manner, the coolant flowing through the first flow passage 16 is rectified and thereby led to the aforesaid gap between the peripheral edge of the rear end surface 71 of the tool T and the inner wall surface of the tool attachment portion 2B. Accordingly, the coolant can pass through the gap between the peripheral edge of the rear end surface 71 of the tool T and the inner wall surface of the tool attachment portion 2B smoothly, without impinging directly on the rear end surface 71 of the tool T. As a result, a loss of momentum in the flow of the coolant caused by impingement of the coolant on the rear end surface 71 of the tool T can be prevented.

In a case where air is used as the coolant, the flow of the coolant (air) decreases particularly dramatically in momentum when the coolant impinges on the rear end surface 71 of the tool T. Therefore, providing the rectifying member 70 is extremely advantageous in terms of maintaining momentum in the flow of the coolant (air).

Further, a sectional area of the first flow passage 16 in the interior of the rectifying member 70 (in other words, a total sectional area of the through holes 74A, 74B) is smaller than a sectional area of the first flow passage 16 on the upstream side of the rectifying member 70. More specifically, the sectional area of the first flow passage 16 is reduced gradually from the upstream side to a downstream side of the first flow passage 16 by the projecting portion 72, and finally reaches the total sectional area of the through holes 74A, 74B. Therefore, the coolant flowing through the first flow passage 16 increases in pressure while passing through the rectifying member 70. Note that the projecting portion 72 of the rectifying member 70 has a substantially conical shape and does not therefore cause pressure loss in the coolant. Hence, the coolant can be separated and led toward the respective through holes 74A, 74B smoothly.

By narrowing the first flow passage 16 using the rectifying member 70 so as to increase the pressure of the coolant, as described above, a directivity of the coolant flowing out through the outlet portions 76 toward a desired position (the aforesaid gap between the peripheral edge of the rear end surface 71 of the tool T and the inner wall surface of the tool attachment portion 2B) is improved. Therefore, the coolant flowing through the first flow passage 16 can be led more effectively to the gap between the peripheral edge of the rear end surface 71 of the tool T and the inner wall surface of the tool attachment portion 2B. Hence, the coolant can be supplied to the ejection port 23 while maintaining a high pressure, and ejected forcefully through the ejection port 23.

Further, by increasing the pressure of the coolant flowing through the first flow passage 16 using the rectifying member 70, the high-pressure coolant can be ejected forcefully through the ejection port 23. Particularly when air is used as the coolant, it is more difficult to supply an amount of coolant (air) required to cool the tool T than with other types of coolant, and therefore increasing the pressure of the coolant using the rectifying member 70 is extremely advantageous in terms of enabling forceful ejection of the high-pressure coolant through the ejection port 23.

Note that the rectifying member 70 may be formed from resin and manufactured using a known method such as injection molding. In so doing, a manufacturing cost of the rectifying member 70 can be reduced. Accordingly, a plurality of rectifying members 70 having through holes 74A, 74B in various sizes and outlet portions 76 formed at various bend angles θ relative to the central axis of the rectifying member 70 may be prepared in advance and used selectively as an appropriate rectifying member 70 corresponding to the type of the tool T.

Furthermore, as shown in FIG. 10A, in the tool holder 100, a vane portion 80 is provided in the second flow passage 18 between the tubular wall 22 of the cover 20 and the outer periphery of the tool attachment portion 2B. As shown in FIGS. 10A and 12, the vane portion 80 is provided integrally with the inner race 32 of the bearing 30. More specifically, the inner race 32 of the bearing 30 is extended to the tip end surface 5 side of the tool attachment portion 2B such that an extension portion 81 (see FIG. 12) not covered by the outer race 34 is formed on the inner race 32, and the vane portion 80 is provided on the extension portion 81. The vane portion 80 is constituted by a recessed portion 82 formed by cutting away an outer periphery of the extension portion 81, and a projecting portion 84 provided on an outer peripheral surface of the extension portion 81 along a boundary of the recessed portion 82. The recessed portion 82 is formed from a side wall surface 82A, an upper wall surface 82B, and an inclined surface 82C. The inclined surface 82C inclines so as to deviate in an opposite direction to a rotation direction of the inner race 32 toward the tip end surface 5 side of the tool attachment portion 2B. An incline angle of the inclined surface 82C relative to a central axis of the inner race 32 may be set within a range of no less than 30 degrees and no more than 45 degrees, for example. Note that the vane portion 80 may be provided in a plurality in a circumferential direction of the extension portion 81.

By providing the vane portion 80 in the second flow passage 18 in this manner, when the inner race 32 rotates in the direction of an arrow in FIG. 12 together with the tool attachment portion 2B, coolant flowing into the recessed portion 82 is pushed out to the tip end surface 5 side of the tool attachment portion 2B by the inclined surface 82C. As a result, the high-pressure coolant can be ejected forcefully through the ejection port 23 formed in the bottom surface 24 of the cover 20. Particularly when air is used as the coolant, it is more difficult to supply the amount of coolant (air) required to cool the tool T than with other types of coolant, and therefore providing the vane portion 80 is extremely advantageous in terms of enabling forceful ejection of the high-pressure coolant through the ejection port 23.

Further, during machining using the tool T, the vane portion 80 rotates together with the tool attachment portion 2B, and there is therefore no need to provide a separate power supply for driving the vane portion 80. Moreover, the vane portion 80 is provided in the extension portion 81 of the inner race 32, and therefore an increase in the number of components accompanying use of the vane portion 80 can be suppressed.

Note that a coolant flow other than the flow of coolant that is pushed out by the vane portion 80 toward the tip end surface 5 side of the tool attachment portion 2B exists in the second flow passage 18. More specifically, coolant that flows between the tip end surface 5 of the tool attachment portion 2B and the bottom surface 24 of the cover 20 from the first flow passage 16 but is not ejected through the ejection port 23 is reversed by a reaction force from the bottom surface 24 of the cover 20 so as to flow toward the bearing 30. Furthermore, the coolant that is pushed out by the vane portion 80 toward the tip end surface 5 side of the tool attachment portion 2B is reversed by the reaction force from the bottom surface 24 of the cover 20 so as to flow toward the bearing 30. Hence, the coolant in the second flow passage 18 has a complicated flow including a swirl flow, but regardless of the coolant flow through the second flow passage 18, the pressure of the coolant in the second flow passage 18 is clearly increased by providing the vane portion 80. Therefore, a sufficient amount of coolant can be supplied to the bearing 30 through the second flow passage 18 such that the bearing 30 can be lubricated and cooled effectively. Particularly when air is used as the coolant, it is more difficult to supply the amount of coolant (air) required to cool the bearing 30 than with other types of coolant, and therefore increasing the pressure in the second flow passage 18 by providing the vane portion 80 is extremely advantageous in terms of ensuring that the coolant is supplied to the bearing 30 reliably.

Furthermore, as shown in FIG. 10A, a blocking portion 90 that prevents the coolant from flowing out of a space 91 between the cover 20 and the outer periphery of the tool attachment portion 2B is provided in the tool holder 100. The space 91 is a region that includes the second flow passage 18 between the tubular wall 22 of the cover 20 and the outer periphery of the tool attachment portion 2B and a space between the whirl-stop ring 26 of the cover 20 and the outer periphery of the tool attachment portion 2B.

As shown in FIGS. 10A and 10B, the blocking portion 90 is constituted by an inward flange 92 provided on an upper end portion of the whirl-stop ring 26, and a ring member 94 attached to the outer periphery of the tool attachment portion 2B so as to cover the inward flange 92.

Further, a small gap 96 is formed between a tip end surface of the inward flange 92 and the outer periphery of the tool attachment portion 2B, and a small gap 98 is formed between a lower surface of the ring member 94 and an upper surface of the inward flange 92. The small gaps 96, 98 are provided to ensure that the tool attachment portion 2B and the ring member 94 attached thereto do not contact the whirl-stop ring 26, thereby enabling relative rotation between the tool attachment portion 2B and the whirl-stop ring 26.

Although not shown clearly in FIG. 10A, a coolant flow passage structure on the periphery of the bearing 30 is constituted by the gap 36 (36A, 36B, 36C) and the third flow passage 50 (more specifically, the communicating hole 52, the upper surface groove 53, and the through hole 54), similarly to the first embodiment described using FIG. 4.

The small gaps 96, 98 in the blocking portion 90 are set to be smaller than the gap 36 (36A, 36B, 36C). For example, when the width of the gap 36B is set at approximately 0.5 mm, the width of the gap 36A is set at approximately 0.2 mm, and the width of the gap 36C is set at approximately 0.05 mm, the small gaps 96, 98 in the blocking portion 90 may be set at no more than 0.01 mm. In so doing, the coolant can be effectively prevented from flowing out of the space 91 by the blocking portion 90 while maintaining the amount of coolant passing through the bearing 30 via the gap 36 (36A, 36B, 36C).

Further, a flow passage formed by the small gap 96 between the tip end surface of the inward flange 92 and the outer periphery of the tool attachment portion 2B and the small gap 98 between the lower surface of the ring member 94 and the upper surface of the inward flange 92 is bent, and therefore the coolant is prevented from flowing out of the space 91 even more effectively.

By preventing the coolant from flowing out of the space 91 between the cover 20 and the outer periphery of the tool attachment portion 2B using the blocking portion 90 in this manner, the coolant filling the space 91 can be maintained at a high pressure. Therefore, the pressurized coolant in the space 91 can function as a damper (a cushion) to dampen vibration and chatter by the tool attachment portion 2B, and as a result, a reduction in machining precision and wear on the tool T can be prevented. Note that the reason why the coolant filling the space 91 between the cover 20 and the outer periphery of the tool attachment portion 2B functions as a damper is that the cover 20 is prevented from co-rotating with the tool attachment portion 2B by the stopper 40, and therefore the cover 20 remains stationary independently of the tool attachment portion 2B.

According to an experiment conducted by the inventor, when cutting was performed using an end mill while the blocking portion 90 was provided, it was possible to reduce a main shaft load (%) greatly in comparison with a case where cutting was performed using the same end mill without providing the blocking portion 90. For example, following an investigation into the effect of the presence of the blocking portion 90 on the main shaft load (%) in relation to a grinding end mill (a power mill) having a tool diameter of 5 mm, it was found that the main shaft load was approximately 5% when the blocking portion 90 was not provided and approximately 3% when the blocking portion 90 was provided. It is evident from this experiment result that by employing the blocking portion 90, vibration and chatter by the tool attachment portion 2B can be dampened.

Further, by providing the blocking portion 90, infiltration of foreign matter into the space 91 can be prevented. As a result, a situation in which the functions of the bearing 30 are impaired by foreign matter can be avoided.

As will be described below, the tool holder 100 also differs from the tool holder 1 according to the first embodiment in a method of enclosing the bearing 30. More specifically, the tool holder 100 differs from the first embodiment in that a plug piece 37' not having a male screw is used instead of the plug bolt 37.

In the tool holder 100, the bearing 30 is enclosed by a following procedure. First, the R groove 35 is formed on the inner peripheral side of the outer race 34 including the plug piece 37' in a condition where the plug piece 37' is inserted into the bearing inlet hole 33 in the outer race 34. The plug piece 37' is then removed, whereupon the outer race 34 is attached to the inner race 32 and the bearing 30 is introduced into the R groove 35 between the inner race 32 and the outer race 34 through the bearing inlet hole 33. The bearing inlet hole 33 is then plugged by the plug piece 37' formed with the R groove 35. Finally, the plug piece 37' is fixed to the outer race 34 by a set screw 102. As a result, the bearing 30 is enclosed in the R groove 35 between the inner race 32 and the outer race 34.

Note that FIG. 10A shows only the plug piece 37' and the set screw 102 provided for the upper side row of bearings 30, from among the two rows, upper and lower rows, of bearings 30, but the plug piece 37' and the set screw 102 are provided similarly for the lower side row of bearings 30.

The plug piece 37' is fixed by the set screw 102 in order to position the plug piece 37' so that a raceway surface of the plug piece 37' in which the R groove 35 is formed aligns with a raceway surface of the part of the outer race 34 other than the plug piece 37' in which the R groove 35 is formed.

When the bearing 30 is enclosed using the plug bolt 37, as in the first embodiment, it is difficult to align the raceway surface of the plug piece 37 in which the R groove 35 is formed with the raceway surface of the outer race 34 in which the R groove 35 is formed. Therefore, by plugging the bearing inlet hole 33 using the plug piece 37' not having a male screw instead of the plug bolt 37 and positioning the plug piece 37' using the set screw 102, the raceway surface of the plug piece 37' in which the R groove 35 is formed can be aligned with the raceway surface of the outer race 34 in which the R groove 35 is formed easily.

Embodiments of the present invention were described in detail above, but the present invention is not limited thereto, and various amendments and modifications may be implemented within a scope that does not depart from the spirit of the present invention.

For example, the content described in the first embodiment may be combined appropriately with the content described in the second embodiment.

EXPLANATION OF REFERENCE NUMERALS

1 tool holder
2 milling chuck main body
2A shank portion
2B tool attachment portion
3 pull stud
4 insertion port
5 tip end surface
6 collet
7 slit
8 fastening bolt
10 fastening nut
11 fastening nut fixing bolt
12 screw portion
14 fastening bolt hexagonal portion
16 first flow passage
18 second flow passage
20 cover
21 through hole
22 tubular wall
23 ejection port
24 bottom surface
26 whirl-stop ring
27 recessed portion
28 wall surface
29 set screw
30 bearing
32 inner race
33 bearing inlet hole
34 outer race
35 R groove
36 gap
37 plug bolt
37' plug piece
38 screw portion
40 stopper
42 whirl-stop pin
44 spring
46 piston rod
48 air cylinder
50 third flow passage
52 communicating hole
53 upper surface groove
54 through hole
60 circular portion
62 elongated hole portion
63 C surface
70 rectifying member (pressure controller)
71 rear end surface
72 projecting portion
74A through hole
74B through hole
76 outlet portion
78 screw portion
80 vane portion
81 extension portion
82 recessed portion
82A side wall surface
82B upper wall surface
82C inclined surface
84 projecting portion
90 blocking portion
91 space
92 inward flange
94 ring member
96 small gap 98 small gap
100 tool holder
102 set screw
S main shaft
T tool

The invention claimed is:

1. A tool holder for attaching a tool to a main shaft of a machine tool, wherein comprising:
a shank portion provided on one end of said tool holder and gripped by said main shaft;
a tool attachment portion provided on another end of said tool holder and having an insertion port into which said tool is inserted in a tip end surface thereof;
a cover having a tubular wall that covers an outer periphery of said tool attachment portion and a bottom surface that covers said tip end surface of said tool attachment portion;
a bearing provided between said tubular wall of said cover and said tool attachment portion; and
a stopper that prevents said cover from co-rotating with said tool attachment portion,
wherein a through hole penetrated by said tool and an ejection port disposed on a periphery of said through hole in order to eject a coolant toward said tool are provided in said bottom surface of said cover,
a first flow passage through which said coolant supplied from said main shaft side flows is provided in an interior of said shank portion and said tool attachment portion such that said coolant is led between said tip end surface of said tool attachment portion and said bottom surface of said cover through said first flow passage,
a second flow passage through which said coolant led between said tip end surface of said tool attachment portion and said bottom surface of said cover via said first flow passage flows toward said bearing is provided between said tubular wall of said cover and said tool attachment portion, and
said bearing is lubricated and cooled by coolant supplied via said second flow passage, which forms a part of said coolant.

2. The tool holder according to claim 1, wherein a third flow passage including a communicating hole that extends outward in a radial direction of said cover and a discharge hole that leads to the outside from said communicating hole, through which said coolant is discharged after lubricating and cooling said bearing, is formed in an interior of said cover.

3. A tool holder for attaching a tool to a main shaft of a machine tool, wherein comprising:
a shank portion provided on one end of said tool holder and gripped by said main shaft;
a tool attachment portion provided on another end of said tool holder and having an insertion port into which said tool is inserted in a tip end surface thereof;
a cover having a tubular wall that covers an outer periphery of said tool attachment portion and a bottom surface that covers said tip end surface of said tool attachment portion;
a bearing provided between said tubular wall of said cover and said tool attachment portion; and
a stopper that prevents said cover from co-rotating with said tool attachment portion,
wherein a through hole penetrated by said tool and an ejection port disposed on a periphery of said through hole in order to eject a coolant toward said tool are provided in said bottom surface of said cover,
a recessed portion is provided in an outer periphery of said cover, and
said stopper comprises a whirl-stop pin that engages with said recessed portion in order to prevent said cover from co-rotating.

4. The tool holder according to claim 3, wherein a gap between said recessed portion and said whirl-stop pin in a circumferential direction of said cover when said whirl-stop pin is engaged with said recessed portion is no less than 0.1 mm and no more than 0.5 mm.

5. The tool holder according to claim 3, wherein an outer diameter of said cover in a location where said recessed portion is provided is substantially constant regardless of a diameter of said tool attachment portion.

6. The tool holder according to claim 3, wherein a plurality of said recessed portions are provided around an entire circumference of said cover, and
said stopper further comprises:
an actuator that moves said whirl-stop pin; and
a spring provided between said actuator and said whirl-stop pin.

7. The tool holder according to claim 6, wherein said stopper further comprises a rod that is caused to advance and retreat in a diagonal direction relative to a tool axial center direction by a driving force of said actuator, and
said whirl-stop pin is supported on said rod via said spring.

8. A tool holder for attaching a tool to a main shaft of a machine tool, wherein comprising:
a shank portion provided on one end of said tool holder and gripped by said main shaft;
a tool attachment portion provided on another end of said tool holder and having an insertion port into which said tool is inserted in a tip end surface thereof;
a cover having a tubular wall that covers an outer periphery of said tool attachment portion and a bottom surface that covers said tip end surface of said tool attachment portion;
a bearing provided between said tubular wall of said cover and said tool attachment portion; and
a stopper that prevents said cover from co-rotating with said tool attachment portion,
wherein a through hole penetrated by said tool and an ejection port disposed on a periphery of said through hole in order to eject a coolant toward said tool are provided in said bottom surface of said cover,
a first flow passage through which said coolant supplied from said main shaft side flows is provided in an interior of said shank portion and said tool attachment portion such that said coolant is led between said tip end surface of said tool attachment portion and said bottom surface of said cover through said first flow passage, and
a rectifying member is provided in said first flow passage on an upstream side of a rear end surface of said tool to rectify said coolant so that said coolant flows toward a gap between a peripheral edge of said rear end surface of said tool and an inner wall surface of said tool attachment portion forming said first flow passage.

9. The tool holder according to claim 8, wherein said rectifying member increases a pressure of said coolant by reducing a sectional area of said first flow passage.

10. A tool holder for attaching a tool to a main shaft of a machine tool, wherein comprising:
a shank portion provided on one end of said tool holder and gripped by said main shaft;
a tool attachment portion provided on another end of said tool holder and having an insertion port into which said tool is inserted in a tip end surface thereof;

a cover having a tubular wall that covers an outer periphery of said tool attachment portion and a bottom surface that covers said tip end surface of said tool attachment portion;

a bearing provided between said tubular wall of said cover and said tool attachment portion; and a stopper that prevents said cover from co-rotating with said tool attachment portion, wherein a through hole penetrated by said tool and an ejection port disposed on a periphery of said through hole in order to eject a coolant toward said tool are provided in said bottom surface of said cover, said tool holder further comprising a vane portion that is provided between said tubular wall of said cover and said tool attachment portion to push said coolant out toward said tip end surface of said tool attachment portion.

11. The tool holder according to claim 10, wherein an inner race of said bearing fixed to said outer periphery of said tool attachment portion includes, on said tip end surface side of said tool attachment portion, an extension portion that is not covered by an outer race of said bearing, and said vane portion is provided on said extension portion of said inner race.

12. A tool holder for attaching a tool to a main shaft of a machine tool, wherein comprising:

a shank portion provided on one end of said tool holder and gripped by said main shaft;

a tool attachment portion provided on another end of said tool holder and having an insertion port into which said tool is inserted in a tip end surface thereof;

a cover having a tubular wall that covers an outer periphery of said tool attachment portion and a bottom surface that covers said tip end surface of said tool attachment portion;

a bearing provided between said tubular wall of said cover and said tool attachment portion; and a stopper that prevents said cover from co-rotating with said tool attachment portion, wherein a through hole penetrated by said tool and an ejection port disposed on a periphery of said through hole in order to eject a coolant toward said tool are provided in said bottom surface of said cover, said tool holder further comprising a blocking portion that prevents said coolant from flowing out of a space between said cover and said tool attachment portion such that said space is filled with said coolant in a pressurized condition.

13. The tool holder according to claim 1, wherein said ejection port is provided in a plurality around said through hole in said bottom surface, and said respective ejection ports have different incline angles relative to said tool axial center direction.

14. A tool holder for attaching a tool to a main shaft of a machine tool, wherein comprising:

a shank portion provided on one end of said tool holder and gripped by said main shaft;

a tool attachment portion provided on another end of said tool holder and having an insertion port into which said tool is inserted in a tip end surface thereof;

a cover having a tubular wall that covers an outer periphery of said tool attachment portion and a bottom surface that covers said tip end surface of said tool attachment portion;

a bearing provided between said tubular wall of said cover and said tool attachment portion; and a stopper that prevents said cover from co-rotating with said tool attachment portion, wherein a through hole penetrated by said tool and an ejection port disposed on a periphery of said through hole in order to eject a coolant toward said tool are provided in said bottom surface of said cover, said ejection port is formed by connecting a circular portion to an elongated hole portion that has a width which is smaller than a diameter of said circular portion and extends from said circular portion in a direction heading away from said through hole, and an incline angle of said elongated hole portion relative to said tool center direction is larger than an incline angle of said circular portion relative to said tool center direction.

15. The tool holder according to claim 1, wherein said cover is configured such that at least said bottom surface is allowed to be attached and detached freely.

16. A machine tool comprising the tool holder according to claim 1.

* * * * *